United States Patent
Mizumukai

(10) Patent No.: US 7,847,982 B2
(45) Date of Patent: Dec. 7, 2010

(54) COMMUNICATION APPARATUS AND FACSIMILE COMMUNICATION METHOD

(75) Inventor: Wataru Mizumukai, Gifu (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1012 days.

(21) Appl. No.: 11/647,405

(22) Filed: Dec. 29, 2006

(65) Prior Publication Data

US 2007/0153325 A1    Jul. 5, 2007

(30) Foreign Application Priority Data

Dec. 29, 2005    (JP)    ............... 2005-380523

(51) Int. Cl.
  *H04N 1/00*    (2006.01)
(52) U.S. Cl. ...................... 358/400; 358/405
(58) Field of Classification Search ................ 704/207; 370/352; 375/345; 379/100.01; 358/400, 358/405, 407, 434, 435
  See application file for complete search history.

(56) References Cited

U.S. PATENT DOCUMENTS

| | | | |
|---|---|---|---|
| 5,018,022 A | 5/1991 | Tatsumi | |
| 6,449,063 B1 | 9/2002 | Yoshida et al. | |
| 7,113,311 B2* | 9/2006 | Sasaki et al. | 358/407 |
| 2002/0080414 A1* | 6/2002 | Tanimoto | 358/402 |
| 2007/0025480 A1* | 2/2007 | Tackin et al. | 375/345 |
| 2007/0150264 A1* | 6/2007 | Tackin et al. | 704/207 |

FOREIGN PATENT DOCUMENTS

| | | |
|---|---|---|
| JP | 63-269864 | 11/1988 |
| JP | 6-105101 | 4/1994 |
| JP | 6-125440 | 5/1994 |
| JP | 2000-156771 | 6/2000 |
| JP | 2001-8012 | 1/2001 |

* cited by examiner

*Primary Examiner*—Jerome Grant, II
(74) *Attorney, Agent, or Firm*—Banner & Witcoff, Ltd.

(57) ABSTRACT

A communication apparatus (transmitting a first side image and a second side image of each document scanned by a scanner at a scanning position in a feeding process to a receiver according to a facsimile transmission protocol) comprises: a facsimile controller which transmits an MPS to the receiver on each completion of the transmission of the image of each side while retransmitting the MPS to the destination terminal when an MCF returned from the receiver in response to the MPS is not detected within a certain period of time; and an MCF detection unit which allows the facsimile controller to detect the MCF based on a fact that the number of times of reception of the MCF has reached a preset number of times.

13 Claims, 16 Drawing Sheets

COMMUNICATION APPARATUS AND FACSIMILE COMMUNICATION METHOD

CROSS-REFERENCE TO RELATED APPLICATION

This application claims priority under 35 U.S.C. §119 from Japanese Patent Application No. 2005-380523, filed on Dec. 29, 2005. The entire subject matter of the application is incorporated herein by reference.

BACKGROUND

1. Technical Field

Illustrative aspects of the present invention relates to a communication terminal and a facsimile communication method for transmitting image data to a receiver (destination terminal) according to a facsimile transmission protocol in conformity with the ITU-T (International Telecommunication Union-Telecommunication Standardization Sector) recommendations, and in particular, to a communication terminal and a facsimile communication method capable of securing a "preparation time" necessary for preparing for the transmission of image data (document image) of the next page without causing a line disconnection.

2. Related Art

The T series recommendations (T.30, T.34, T.37, T.38, etc.) made by the ITU-T are widely known as an international standard of data transmission protocol between facsimile machines (an example of communication terminals). In the T series recommendations, a data transmission protocol made up of five phases (phase A-phase E) is specified as shown in FIG. 16. Ordinary facsimile machines are controlled to operate according to the data transmission protocol in order to ensure communication compatibility with receivers.

Among the T series recommendations, the recommendation T.30 specifies that an instruction signal should be transmitted to the receiver (destination terminal) repeatedly (up to three times) when no valid response signal in response to the instruction signal is received from the receiver within approximately 3 seconds (3 seconds±15%) after the transmission of the instruction signal, and the line (call) should be disconnected by transmitting a DCN (Disconnect) upon failure on the third try. This specification will hereinafter be referred to as a "communication interruption specification". Therefore, ordinary facsimile machines are controlled to retransmit an MPS (Multi Page Signal) (as an example of the instruction signal) to the receiver when an MCF (Message Confirmation Signal) (as the response signal from the receiver) is not received within a prescribed time period T (approximately 3 seconds) after the transmission of the MPS to the receiver.

However, in a facsimile machine designed to scan a first side image (front side image, for example) and a second side image (back side image, for example) of a document by executing bidirectional feeding (inverting) of the document and transmit the scanned images (image data) of the both sides of the document to a receiver, a "preparation time" necessary for the scanning and the transmission of the second side image after the transmission of the first side image can exceed three seconds even if the document feeding is carried out at the highest speed avoiding the paper jam. Further, when the facsimile machine successively scans a plurality of documents, each document is generally reversed (i.e. fed by means of the bidirectional feeding) again after the scanning of the second side image in order to adjust the direction of the document ejected to an output tray. In such cases, a preparation time necessary for the transmission of the first side image of the next document after the transmission of the second side image of the previous (current) document can exceed three seconds, by which a timeout occurs in the receiver (due to the delay in the transmission of the first side image of the next document) and the line (call) is disconnected. Incidentally, the line disconnection due to the timeout occurs when no instruction signal (e.g. signal for transmission of data) is transmitted to the receiver within three seconds after the reception of a response signal, that is, when a "no-communication state" of the receiver after transmitting a response signal (e.g. MCF) has continued for more than three seconds (timeout period specified in the ITU-T recommendations (see the recommendation T.30)).

As a technique for preventing such a line disconnection, facsimile machines like those disclosed in Japanese Patent Provisional Publication No. 2001-8012 (hereinafter referred to as JP 2001-8012A) and Japanese Patent Provisional Publication No. HEI06-125440 (hereinafter referred to as JP HEI06-125440A) are well known. Such a facsimile machine transmits an EOM (End Of Message) signal to the receiver (for informing the receiver of a change in the transmission mode) after the completion of the transmission of the first side image. When the MCF is received from the receiver, the facsimile machine returns to the phase B and executes the facsimile communication process according to the procedures of the phase B and following phases. With such a technique, the aforementioned timeout period can be extended virtually.

Meanwhile, in Japanese Patent Provisional Publication No. SHO63-269864 (hereinafter referred to as JP SHO63-269864A), a facsimile machine which prevents the line disconnection due to the timeout by transmitting a false signal (for holding the line) to the receiver has been disclosed.

In the facsimile machines of JP 2001-8012A and JP HEI06-125440A, a time necessary for a process for establishing a data link in the phase B (included in the timeout period) is extended virtually. However, the extended time can vary depending on the state of the transmission channel (e.g. telephone circuit), the state of synchronization, and/or communication specifications such as the transmission rate (modem rate), and thus the preparation time (necessary for completing the preparation for transmitting the image of the next page) can not necessarily be secured. Further, when the transmission channel is congested and the traffic is restricted or when the transmission rate is low, the extended time gets too long and the facsimile communication takes an extremely long time even though the preparation time can be secured with ease.

Meanwhile, the facsimile machine of JP SHO63-269864A is required to execute special procedures (a process for generating the false signal, a process for transmitting the false signal, etc.) that are not specified in the ITU-T recommendations, which can cause complication of process and deterioration of versatility of the facsimile machine.

SUMMARY

Aspects of the present invention relate to a communication apparatus and a facsimile communication method, capable of reliably securing a preparation time (necessary for the preparation for the transmission of the image of the next page) by a simple technique without causing the line disconnection, can be provided.

BRIEF DESCRIPTION OF THE ACCOMPANYING DRAWINGS

DETAILED DESCRIPTION

General Overview

Figure 1:
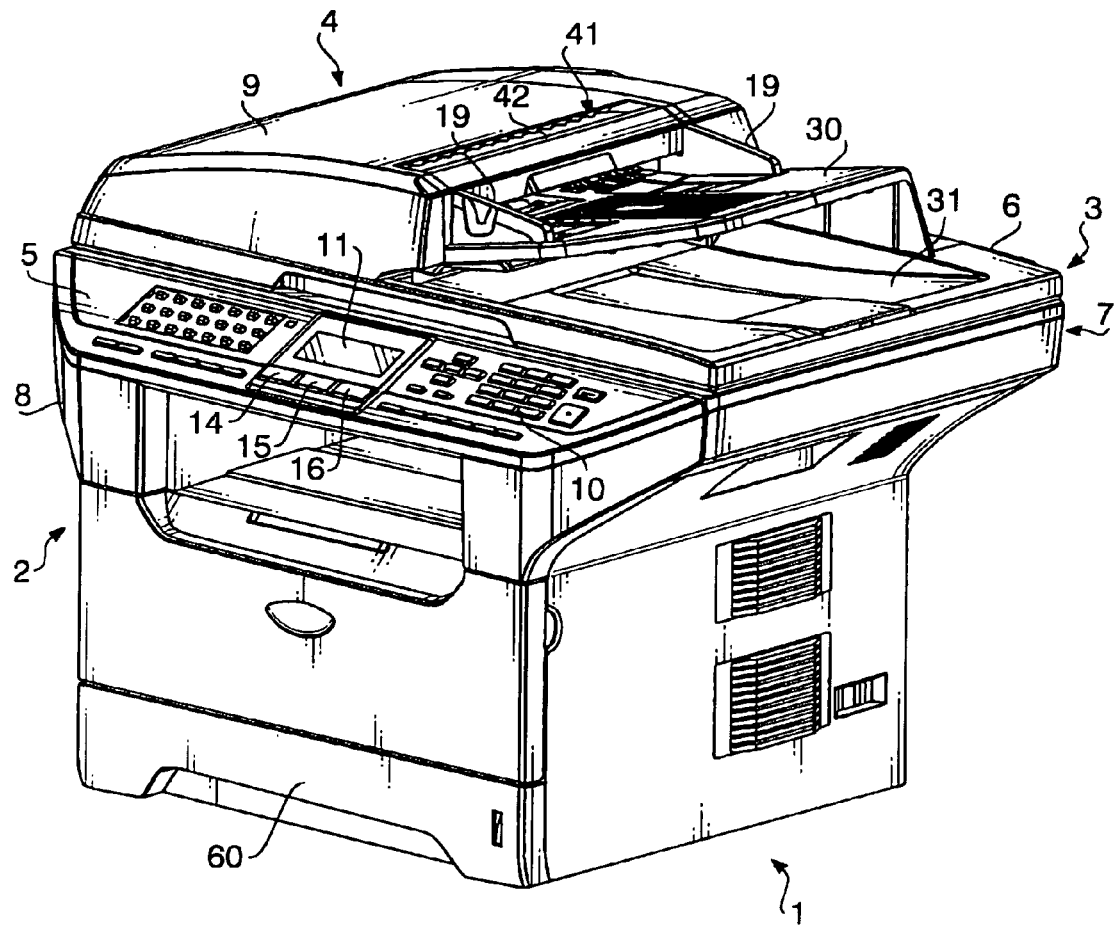
FIG. 1 is a general perspective view of an MFD (Multi Function Device) as an example of a communication terminal in accordance with an embodiment of the present invention.

In accordance with an aspect of the present invention, there is provided a communication apparatus which transmits a first side image and a second side image of each document scanned by a scanner at a scanning position in a feeding process to a receiver according to a facsimile transmission protocol. The communication terminal comprises: a facsimile controller which transmits an MPS to the receiver on each completion of the transmission of the image of each side of the document while retransmitting the MPS to the receiver when an MCF returned from the receiver in response to the MPS is not detected within a certain period of time after the transmission of the MPS; and an MCF detection unit which allows the facsimile controller to detect the MCF based on a fact that the number of times of reception of the MCF from the receiver has reached a preset number of times.

The communication terminal in accordance with the present invention prevents the line disconnection by preventing the timeout (occurring in the receiver due to delay in the transmission of an image), by effectively using the aforementioned communication interruption specification in the ITU-T recommendation T.30 (specifying that an instruction signal should be transmitted to the receiver repeatedly (up to three times) when no valid response signal in response to the instruction signal is received within approximately 3 seconds (3 seconds±15%) after the transmission of the instruction signal and the line (call) should be disconnected by outputting a DCN upon failure on the third try). In the communication terminal of the present invention, even when the MCF (returned from the receiver in response to the MPS transmitted by the facsimile controller) is received, the detection of the MCF by the facsimile controller is interrupted (blocked) by the MCF detection unit before the number of times of reception of the MCF reaches the preset number of times. Thus, the MCF from the receiver is detected by the facsimile controller at the point when the number of times of reception of the MCF has reached the preset number of times. Each time the MCF in response to the MPS is interrupted by the MCF detection unit, the MPS (as the instruction signal) is retransmitted by the facsimile controller a prescribed time period (e.g. 3 seconds) after the transmission of the MPS according to the communication interruption specification, by which the excessively long no-communication state is avoided and the line disconnection due to the timeout is prevented.

Preferably, the preset number of times is preset at numbers of less than three since the DCN is outputted upon failure on the third try according to the communication interruption specification. The preset number of times is preset properly depending on specifications of the communication terminal, etc. For example, the timeout period is virtually extended for three seconds when the preset number of times is 1, and for six seconds (three seconds×2) when the preset number of times is 2. Incidentally, in cases where the facsimile transmission protocol is not restricted by the communication interruption specification (ITU-T recommendation T.30), the preset number of times is not restricted to numbers of less than three.

Specifically, the MCF detection unit may be configured to ignore each MCF received from the receiver based on a fact that the number of times of reception of the MCF is less than the preset number of times.

Specifically, the MCF detection unit may also be configured to interrupt transfer of each MCF received from the receiver to the facsimile controller based on a fact that the number of times of reception of the MCF is less than the preset number of times.

Preferably, the preset number of times employed by the MCF detection unit after the transmission of the second side image to the receiver is preset to be larger than the preset number of times employed by the MCF detection unit after the transmission of the first side image to the receiver when the document feeding process is executed for feeding each document to the scanning position with the first side facing the scanner, reversing the document which passed the scanning position, feeding the document again to the scanning position with the second side facing the scanner, further reversing the document which passed the scanning position, and feeding the document again to the scanning position with the first side facing the scanner.

Preferably, the communication apparatus is configured to successively transmits partial images of a prescribed width as each partial image is obtained by the document scanning by the scanner. The present invention is suitable for such a communication terminal successively transmitting scanned images while executing the image scanning.

In accordance with another aspect of the present invention, there is provided a facsimile communication method for a communication terminal which transmits a first side image and a second side image of each document scanned by a scanner at a prescribed document scanning position in a document feeding process to a receiver according to a prescribed facsimile transmission protocol and which comprises a facsimile controller transmitting an MPS to the receiver on each completion of the transmission of the image of each page while retransmitting the MPS to the receiver when an MCF returned from the receiver in response to the MPS is not detected within a prescribed time period after the transmission of the MPS. The facsimile communication method comprises an MCF detection control step of preventing the facsimile controller from detecting the MCF before the number of times of reception of the MCF from the receiver reaches a preset number of times.

Preferably, the preset number of times employed by the MCF detection control step is preset at numbers of less than three.

Specifically, the MCF detection control step may be configured to ignore each MCF received from the receiver before the number of times of reception of the MCF reaches the preset number of times.

Specifically, the MCF detection control step may also be configured to interrupt transfer of each MCF received from the receiver to the facsimile controller before the number of times of reception of the MCF reaches the preset number of times.

Preferably, the preset number of times employed by the MCF detection control step after the transmission of the second side image to the receiver is preset to be larger than the preset number of times employed by the MCF detection control step after the transmission of the first side image to the receiver when the document feeding process is executed for feeding each document to the document scanning position with the first side facing the scanner, switching back the document which passed the document scanning position, feeding the document again to the document scanning position with the second side facing the scanner, further switching back the document which passed the document scanning position, and feeding the document again to the document scanning position with the first side facing the scanner.

In accordance with another aspect of the present invention, there is provided a facsimile communication method for a communication apparatus which transmits a first side image and a second side image of each document scanned by a scanner at a scanning position in a feeding process to a receiver according to a facsimile transmission protocol, comprising: an MPS transmitting step of transmitting an MPS to the receiver on each completion of the transmission of the image of each side; an MCF detecting step of detecting an MCF returned from the receiver in response to the MPS; an MPS retransmitting step of retransmitting the MPS to the receiver when the MCF returned from the receiver in response to the MPS transmitted in the MPS transmitting step or the MPS retransmitting step is not detected by the MCF detecting step within a certain period of time after the transmission of the MPS; and an MCF detection control step of preventing the MCF detecting step from detecting the MCF based on a fact that the number of times of reception of the MCF from the receiver is less than a preset number of times.

According to another aspect of the invention, there is provided a computer readable medium having computer readable instructions stored thereon, which, when executed by a computer functioning as a communication apparatus transmitting a first side image and a second side image of each document scanned by a scanner at a scanning position in a feeding process to a receiver according to a facsimile transmission protocol, are configured to transmit an MPS to the receiver on each completion of the transmission of the image of each side, to detect an MCF returned from the receiver in response to the MPS, to retransmit the MPS to the receiver when the MCF returned from the receiver in response to the MPS transmitted is not detected within a certain period of time, and to prevent the MCF from being detected based on a fact that the number of times of reception of the MCF from the receiver is less than a preset number of times.

With the above configurations, even when the MCF (in response to the MPS transmitted to the receiver) is received, the MCF is not detected by the facsimile controller when the number of times of reception of the MCF has not reached the preset number of times. Therefore, the MPS (as the instruction signal) is transmitted again when at least 3 seconds (±15%) has passed since the transmission of the MPS, by which the excessively long no-communication state between the communication terminal and the receiver is avoided and the disadvantage of the line disconnection caused by the timeout is eliminated. Since the extended time for the timeout period is fixed (e.g. 3 seconds or 6 seconds) although it depends on the preset number of times, the preparation time for the transmission of the image of the next page can be secured reliably while preventing a too long facsimile transmission time (due to a too long extended time) by properly setting the preset number of times (or the number of times of prevention (interruption) of the detection of the MCF) depending on the specifications of the communication terminal, etc.

Embodiment

FIG. 1 is a general perspective view of an MFD (Multi Function Device) 1 as an example of a communication terminal (apparatus) in accordance with an embodiment of the present invention. The MFD 1 is a device having multiple functions (printer function, scanner function, copy function, facsimile function, etc.) in one body. As shown in FIG. 1, the MFD 1 is integrally provided with a printer unit 2 placed in the lower part of the MFD 1, a image reading unit 3 placed above the printer unit 2, a document cover 6 (equipped with an ADF (Automatic Document Feeder) 4) placed at the top of the MFD 1, and an operation panel 5 placed in the front of the top surface of the MFD 1.

The scanner function is a function of scanning an image on a document with the image reading unit 3 and transferring image data obtained by the scanning to a device such as an exiting PC (Personal Computer), memory card, internal memory or USB (Universal Serial Bus) memory. The copy function is a function of scanning an image on a document with the image reading unit 3 and printing the scanned image on a print medium (e.g. paper) with the printer unit 2. The printer function is a function of printing an image, text, etc. on a print medium with the printer unit 2 according to print data (image data, text data, etc.) transferred from the aforementioned device.

The facsimile function is a function of transmitting an image (image data) scanned by the image reading unit 3 to a receiver (destination terminal) via a transmission line (e.g. telephone line) while receiving an image (image data) transmitted from a communication terminal via the transmission line and printing the image on a print medium with the printer unit 2. The MFD 1 of this embodiment can be regarded as an example of a communication terminal in accordance with the present invention since the MFD 1 has the facsimile function. Incidentally, a device (MFD, etc.) is not necessarily required to have all the above functions in one body in order to implement the present invention, that is, the present invention can be implemented by a device as long as the device has the facsimile function. Therefore, the present invention is of course applicable to a special-purpose facsimile machine having the facsimile function only. This invention is also applicable to the PC installed a facsimile driver software or a facsimile modem.

In the following, the components of the MFD 1 will be briefly explained in turn. Incidentally, the configuration of the MFD 1 described below is just an illustrative example and can be properly modified in various ways without departing from the scope and spirit of the present invention.

The operation panel 5 for letting the user operate the printer unit 2 and the image reading unit 3 is placed in the front of the top surface of the MFD 1 (i.e. on the front top surface of the image reading unit 3). The operation panel 5 includes various operation keys 10, an LCD (Liquid Crystal Display) 11, etc.

The operation keys 10 on the operation panel 5 include, for example, a start button to be pressed for starting the operation of the printer unit 2 and/or the image reading unit 3, a stop button to be pressed for stopping the operation or finishing a setting operation, mode selection buttons (including a facsimile mode key 14 for selecting the facsimile function, a scanner mode key 15 for selecting the scanner function and a copy mode key 16 for selecting the copy function), and numeric keys and a cross-shaped directional key to be used for inputting the number of copies, setting information (e.g. resolution, the number of steps of gradation, etc. of image data to be outputted by the image reading unit 3), etc. The LCD 11 displays the current operation mode of the MFD 1, operating instructions for the user, the setting information, error information, etc.

The MFD 1 is controlled by a controller 100 (see FIG. 5) to operate according to instructions inputted by the user through the operation panel 5. Incidentally, when the MFD 1 is connected to an existing PC, the MFD 1 is operated according to instructions transmitted from a printer driver, scanner driver, etc. installed in the PC. When a certain operation key 10 on the operation panel 5 is pressed by the user, key entry instruction corresponding to the pressed operation key 10 is sent to the controller 100 (see FIG. 5) and the MFD 1 is controlled by the controller 100 to operate according to the key entry instruction. For example, when the user presses the facsimile mode key 14, the MFD 1 is set to the facsimile mode and controlled to be capable of facsimile transmission (transmitting image data to a specified receiver).

Figure 2:
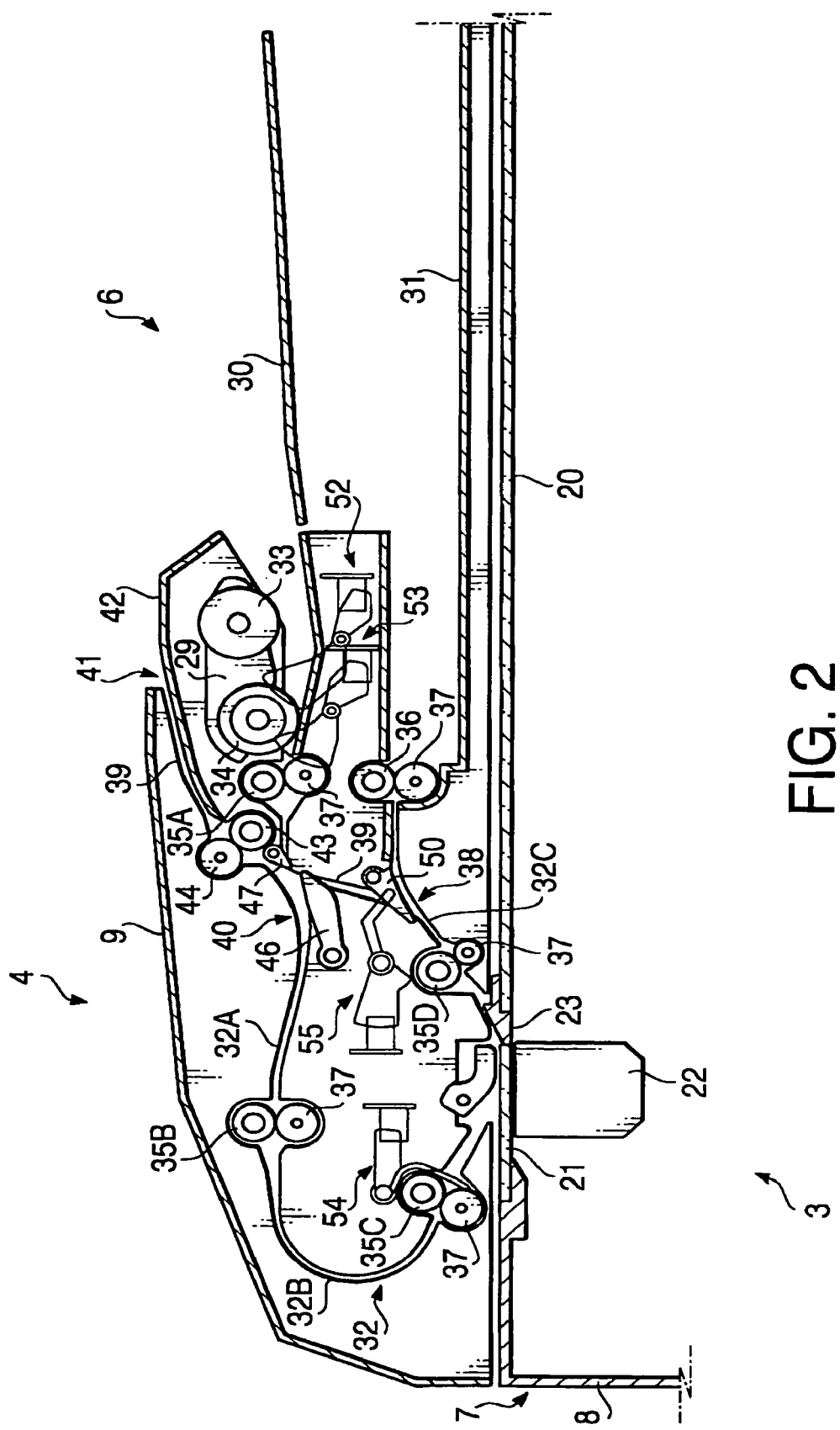
FIG. 2 is a vertical sectional view schematically showing the general composition of a document cover and an ADF (Automatic Document Feeder) of the MFD.

FIG. 2 is a vertical sectional view schematically showing the general composition of the document cover 6 and the ADF 4. As shown in FIGS. 1 and 2, the document cover 6 is attached to a document placing table 7 of the image reading unit 3 with hinges on the back of the MFD 1 to be openable/closable relative to the document placing table 7. The document cover 6 is equipped with the ADF 4 which automatically and continuously feeds a document from an input tray 30 (on which one or more documents are set) to an output tray 31 through a document feeding path 32 (see FIG. 2).

As shown in FIGS. 1 and 2, the input tray 30 (on which the documents are set) and the output tray 31 (to which the documents are discharged) are provided at the top of the document cover 6. The input tray 30 and the output tray 31 are connected with each other by the document feeding path 32. The ADF 4 mounted on the document cover 6 automatically and continuously feeds the document from the input tray 30 to the output tray 31 through the document feeding path 32. In the feeding process executed by the ADF 4, each document fed through the document feeding path 32 passes across a scanning position (document scanning position), at which an image on the document is scanned by an image scanner 22 which has been on standby under the scanning position.

The input tray 30 and the output tray 31 are arranged one above the other at the top of the document cover 6. Specifically, the output tray 31 is placed under the input tray 30. The input tray 30 is a tray for holding one or more documents to be scanned by the ADF 4. For the scanning or copying of a plurality of documents, the documents are stacked up and set on the input tray 30 with their first sides facing upward and with their leading edges (in the feeding direction) inserted into the document feeding path 32.

On the input tray 30, a pair of document guides 19 apart from each other in the depth direction of the MFD 1 (see FIG. 1) is provided to be slidable in the depth direction. The pair of document guides 19, extending vertically from the input tray 30, regulates the position of the documents on the input tray 30 in the width direction of the documents (i.e. in the depth direction of the MFD 1). When one of the document guides 19 is slid in the depth direction of the MFD 1, the other document guide 19 is also slid symmetrically with the former document guide 19 by a well-known interlocking mechanism. Therefore, the documents can be constantly aligned at a central position in the depth direction of the MFD 1, just by placing the documents on the input tray 30 and sliding one of the document guides 19 toward the documents.

The output tray 31, placed under the input tray 30 to be vertically separate therefrom, is formed integrally with the top of the document cover 6. Therefore, documents discharged from the ADF 4 one by one are successively stacked up on the output tray 31. Incidentally, in this embodiment, each document is discharged from the ADF 4 to the output tray 31 with its first side facing downward as will be explained later.

As shown in FIG. 2, the document feeding path 32 connecting the input tray 30 and the output tray 31 with each other is formed inside the ADF 4. The document feeding path 32, roughly in the C-shape in the sectional view of FIG. 2, is formed by members of the body of the ADF 4, guide plates, etc., as a continuous path having a prescribed width allowing for the feeding of the document. Specifically, the document feeding path 32 extends from the input tray 30 toward one edge of the document cover 6 (left-hand side in FIG. 2), curves downward inverting its course to reach the scanning position on platen glass 21, and thereafter extends from the scanning position to the output tray 31. The document feeding path 32 can be roughly segmented into three parts: an upper part 32A as an upper straight part, a lower part 32C as a lower straight part, and a curved part 32B connecting the upper part 32A with the lower part 32C. The document feeding path 32 is used for document feeding in common for both the single-side document scanning and the double-side document scanning executed by the ADF 4 and the image scanner 22.

The document feeding path 32 is provided with a plurality of rollers for feeding the document. Specifically, as shown in FIG. 2, the document feeding path 32 is provided with a pick-up roller 33, a separation roller 34, feed rollers 35A, 35B, 35C and 35D, an ejection roller 36, and pinch rollers 37 (facing and pressing against the above rollers, respectively). The arrangement of rollers (for the document feeding) shown in FIG. 2 is just an example; it is of course possible to properly modify the number and positions of rollers, or to employ other well-known feeding mechanisms.

The pick-up roller 33 and the separation roller 34 are placed in the vicinity of the upstream end of the document feeding path 32. The pick-up roller 33 is provided at the tip of an arm 29 (coaxial with (i.e. turning around) the rotation axis of the separation roller 34) to be freely rotatable. The separation roller 34 is placed on the downstream of the pick-up roller 33 in the feeding direction to be freely rotatable. The pick-up roller 33 and the separation roller 34 are driven and rotated by driving force transmitted from a motor (e.g. stepping motor). The arm 29 is moved up and down by the driving force transmitted from the motor. The pick-up roller 33 and the separation roller 34 are of the same diameter and are rotated at the same circumferential velocity. At a position opposing the separation roller 34, a separation pad (being pressed by the roller surface of the separation roller 34 and separating a document from the stack of documents by use of friction) is placed The feed rollers 35A, 35B, 35C and 35D are placed separately along the document feeding path 32. In this embodiment, the feed roller 35A is placed just on the downstream side of the separation roller 34, the feed roller 35B is placed in the upper part 32A of the document feeding path 32, the feed roller 35C is placed in the lower part 32C of the document feeding path 32 and just on the upstream side of the scanning position, and the feed roller 35D is placed in the lower part 32C and just on the downstream side of the scanning position. The feed rollers 35A-35D are driven and rotated by driving force transmitted from a motor. Incidentally, the above arrangement of feed rollers 35 is just an example; the number and positions of the feed rollers 35 can be modified properly as mentioned above.

At positions opposing the feed rollers 35A, 35B, 35C and 35D, corresponding pinch rollers 37 are placed. Each pinch roller 37 is pressed against the roller surface of the corresponding feed roller 35 (35A, 35B, 35C, 35D), with its axis elastically biased by a spring toward the feed roller 35. When the feed rollers 35A, 35B, 35C and 35D are rotated, the pinch rollers 37 are driven and rotated accordingly. The document is pressed by each pinch roller 37 against each feed roller 35 (35A, 35B, 35C, 35D), by which the torque of each feed roller 35 is efficiently transmitted to the document.

The ejection roller 36 is placed in the vicinity of the downstream end of the document feeding path 32. Similarly to the feed rollers 35, the ejection roller 36 is driven and rotated by driving force transmitted from the motor. Also at a position opposing the ejection roller 36, a pinch roller 37 is placed. The pinch roller 37, elastically biased by a spring, is pressed against the ejection roller 36.

To a connecting position 38 in the lower part 32C of the document feeding path 32, a bidirectional path 39 is connected. The bidirectional path 39 is a path used in the duplex document sheet scanning for feeding the document sheet after the scanning of the first side (executed at the scanning position) from the connecting position 38 (on the downstream side of the scanning position in the feeding direction) again to a part of the document feeding path 32 on the upstream side of the scanning position while switching the leading and trailing edges of the document sheet in the feeding direction. The bidirectional path 39 extends from the connecting position 38 obliquely upward to a position (upper end 41) above the input tray 30, while intersecting with the upper part 32A of the document feeding path 32 at an intersecting position 40. From the intersecting position 40 of the bidirectional path 39 and the upper part 32A, the document sheet after being switched back (i.e. fed by means of the switchback feeding) is returned to the document feeding path 32. Incidentally, the bidirectional path 39 shown in FIG. 2 is just an example for realizing the bidirectional (switchback) feeding of the document, and thus various alternative feeding paths (including the well-known feeding path described in the aforementioned JP 2001-8012A) can of course be employed instead of the bidirectional path 39 as long as the bidirectional feeding is possible. While the bidirectional feeding is employed in this embodiment for reversing the leading and trailing edges of the document sheet in the feeding direction, the way of document feeding is not restricted to the bidirectional feeding as long as the reversing of the leading and trailing edges of the document in the feeding direction is possible.

The upper end 41 of the bidirectional path 39 is open at the top of the ADF 4. On the input tray 30 side (right-hand side in FIG. 2) of the upper end 41, a document supporting part 42 is formed to extend from the upper end 41. The document supporting part 42 is a part for supporting the document sheet discharging from the upper end 41 of the bidirectional path 39 while also being a part of an upper cover 9 of the ADF 4 extending above the pick-up roller 33 and the separation roller 34. The upper cover 9 is formed to be openable/closable relative to the ADF 4, by which the whole ADF 4 (including the pick-up roller 33 and the separation roller 34) can be covered. The document supporting part 42 extends from the upper end 41 of the bidirectional path 39 toward the input tray 30 to reach a position beyond (on the upstream side of) a document supply position of the pick-up roller 33 and the separation roller 34. Therefore, the document entering the bidirectional path 39 in the double-side scanning and discharging from the upper end 41 to the outside of the ADF 4 is supported on the document supporting part 42 without drooping down onto the documents (stacked up on the input tray 30) on the downstream side (left-hand side in FIG. 2) of the document supply position in the feeding direction, by which the documents on the input tray 30 are prevented from being disturbed at the document supply position. Maintenance of the ADF 4 (e.g. removal of jammed paper) is possible by opening the upper cover 9 to expose parts of the document feeding path 32 and the bidirectional path 39 inside the ADF 4.

On the upper end 41 side of the intersecting position 40 of the bidirectional path 39 (i.e. above and to the right of the intersecting position 40 in FIG. 2), a reversible roller 43 is provided. The reversible roller 43 is driven and rotated in normal and reverse directions by driving force transmitted from the motor. At a position opposing the reversible roller 43, a pinch roller 44 is provided. The pinch roller 44, pressed against the roller surface of the reversible roller 43 with its axis elastically biased by a spring toward the reversible roller 43, rotates according to the rotation of the reversible roller 43. The document is pressed by the pinch roller 44 against the reversible roller 43, by which the torque of the reversible roller 43 is efficiently transmitted to the document.

As shown in FIG. 2, guide flaps 46 and 47 for guiding the document to an appropriate feeding path are placed at the intersecting position 40. Incidentally, while only one guide flap 46 is shown in FIG. 2, a plurality of guide flaps 46 in the same shape are arranged at preset intervals in the width direction of the document feeding path 32 (i.e. the direction orthogonal to the sheet of FIG. 2, that is, the depth direction of the MFD 1) to be rotated together. Similarly, while only one guide flap 47 is shown in FIG. 2, a plurality of guide flaps 47 in the same shape are arranged at preset intervals in the width direction of the document feeding path 32 to be rotated together. The guide flaps 46 are provided to be rotatable around a rotation axis (extending in a corner part made by a part of the document feeding path 32 on the scanning position side of the intersecting position 40 and a part of the bidirectional path 39 on the connecting position 38 side of the intersecting position 40) within a prescribed angle. Each guide flap 46 is a flat plate in a flap shape, with its tip projecting toward the intersecting position 40.

The guide flaps 46 are capable of pivoting upward from the position shown in FIG. 2, while being interrupted from pivoting downward from the position shown in FIG. 2 by a guide member of the document feeding path 32 or the bidirectional path 39, for example. When the guide flaps 46 are at the position of FIG. 2 (lower position), the input tray 30 side part (right-hand side part in FIG. 2) of the document feeding path 32 is connected to the scanning position side part (left-hand side part in FIG. 2) of the document feeding path 32 at the intersecting position 40, while the feeding path branching off from the document feeding path 32 to the connecting position 38 side part (lower part in FIG. 2) of the bidirectional path 39 is closed. With this feeding path configuration, a document reaching the intersecting position 40 from the input tray 30 side part (right-hand side part) of the document feeding path 32 is allowed to advance to the scanning position side part (left-hand side part) of the document feeding path 32 while being interrupted from entering the connecting position 38 side part (lower part) of the bidirectional path 39. Meanwhile, a document reaching the intersecting position 40 from the upper end 41 side part (upper part in FIG. 2) of the bidirectional path 39 is similarly allowed to advance to the scanning position side part (left-hand side part) of the document feeding path 32 while being interrupted from entering the connecting position 38 side part (lower part) of the bidirectional path 39.

When the guide flaps 46 pivot upward in FIG. 2, the connecting position 38 side part (lower part) of the bidirectional path 39 is connected to the upper end 41 side part (upper part) of the bidirectional path 39 at the intersecting position 40, while the feeding path branching off from the connecting position 38 side part (lower part) of the bidirectional path 39 to the scanning position side part (left-hand side part) of the document feeding path 32 is closed. With this feeding path configuration, a document reaching the intersecting position 40 from the connecting position 38 side part (lower part) of the bidirectional path 39 is allowed to advance to the upper end 41 side part (upper part) of the bidirectional path 39 while being interrupted from entering the scanning position side part (left-hand side part) of the document feeding path 32.

The guide flaps 46 in this embodiment execute the switching of the feeding path passively, by means of contact with the document. The guide flaps 46 generally stay at the position shown in FIG. 2 (lower position) due to their own weight or biasing force from an elastic member such as a spring. When the document fed in the bidirectional path 39 from the connecting position 38 to the intersecting position 40 makes contact with the guide flaps 46, the guide flaps 46 are pressed by the document and turned upward in FIG. 2. On the other hand, when the document fed in the bidirectional path 39 from the upper end 41 to the intersecting position 40 makes contact with the guide flaps 46, the document is guided by the guide flaps 46 to the scanning position side part (left-hand side part, the upper part 32A) of the document feeding path 32 since the guide flaps 46 are interrupted from turning downward from the position of FIG. 2. The guide flaps 46 are designed in proper flap shapes so that their position (attitude) will easily be changed by contact with a document being fed in the bidirectional path 39 from the connecting position 38 to the intersecting position 40 and so that a document fed in the bidirectional path 39 from the upper end 41 to the intersecting position 40 will easily be guided to the scanning position side part (left-hand side part) of the document feeding path 32. With such guide flaps 46 designed to properly change their position (attitude) when in contact with the document, the need of actively changing the position by transmitting driving force from a motor to the guide flaps 46 is eliminated and the guide flaps 46 can be implemented in a simple configuration.

Meanwhile, the guide flaps 47 are provided to be rotatable around another rotation axis (extending in a corner part made by the input tray 30 side part (right-hand side part) of the document feeding path 32 and the upper end 41 side part (upper part) of the bidirectional path 39) within a prescribed angle. Each guide flap 47 is also a flat plate in a flap shape, with its tip projecting toward the intersecting position 40.

The guide flaps 47 are capable of pivoting leftward from the position shown in FIG. 2, while being interrupted from turning rightward from the position shown in FIG. 2 by a guide member of the document feeding path 32 or the bidirectional path 39, for example. When the guide flaps 47 are at the position of FIG. 2 (right-hand position), the upper end 41 side part (upper part) of the bidirectional path 39 is connected to the scanning position side part (left-hand side part) of the document feeding path 32 at the intersecting position 40, while the feeding path branching off from the connecting position 38 side part (lower part) of the bidirectional path 39 to the input tray 30 side part (right-hand side part) of the document feeding path 32 is closed. With this feeding path configuration, a document reaching the intersecting position 40 from the upper end 41 side part (upper part) of the bidirectional path 39 is guided to the scanning position side part (left-hand side part) of the document feeding path 32 while being interrupted from entering the input tray 30 side part (right-hand side part) of the document feeding path 32. Meanwhile, a document reaching the intersecting position 40 from the connecting position 38 side part (lower part) of the bidirectional path 39 is allowed to advance to the upper end 41 side part (upper part) of the bidirectional path 39 while being similarly interrupted from entering the input tray 30 side part (right-hand side part) of the document feeding path 32.

When the guide flaps 47 pivot leftward in FIG. 2, the input tray 30 side part (right-hand side part) of the document feeding path 32 is connected to the scanning position side part (left-hand side part) of the document feeding path 32 at the intersecting position 40, while the feeding path branching off from the input tray 30 side part (right-hand side part) of the document feeding path 32 to the upper end 41 side part (upper part) of the bidirectional path 39 is closed. With this feeding path configuration, a document reaching the intersecting position 40 from the input tray 30 side part (right-hand side part) of the document feeding path 32 is allowed to advance to the scanning position side part (left-hand side part) of the document feeding path 32 while being interrupted from entering the upper end 41 side part (upper part) of the bidirectional path 39.

The guide flaps 47 in this embodiment execute the switching of the feeding path passively, by means of contact with the document. The guide flaps 47 generally stay at the position shown in FIG. 2 (right-hand position) due to their own weight or biasing force from an elastic member such as a spring. When the document fed in the document feeding path 32 from the input tray 30 to the intersecting position 40 makes contact with the guide flaps 47, the guide flaps 47 are pressed by the document sheet and pivoted leftward in FIG. 2. Meanwhile, even when the document fed in the bidirectional path 39 from the connecting position 38 to the intersecting position 40 makes contact with the guide flaps 47, the document is guided by the guide flaps 47 to the upper end 41 side part (upper part) of the bidirectional path 39 since the guide flaps 47 are interrupted from turning rightward from the position of FIG. 2. The guide flaps 47 are designed in proper flap shapes so that their position (attitude) will easily be changed by contact with a document fed in the document feeding path 32 from the input tray 30 to the intersecting position 40 and so that a document fed in the bidirectional path 39 from the connecting position 38 to the intersecting position 40 will easily be guided to the upper end 41 side part (upper part) of the bidirectional path 39. With such guide flaps 47 designed to properly change their position (attitude) when in contact with the document, the need of actively changing the position by transmitting driving force from a motor to the guide flaps 47 is eliminated and the guide flaps 47 can be implemented in a simple configuration.

The connecting position 38 is also provided with guide flaps 50 as shown in FIG. 2. While only one guide flap 50 is shown in FIG. 2, a plurality of guide flaps 50 in the same shape are arranged at preset intervals in the width direction of the document feeding path 32 to be rotated together. The guide flaps 50 are provided to be rotatable around another rotation axis extending in a corner part made by the bidirectional path 39 (branching off from the document feeding path 32 at the connecting position 38) and the lower part 32C of the document feeding path 32 continuing to the output tray 31. The guide flaps 50 are pivoted downward from the position shown in FIG. 2 by driving force transmitted from a motor. The guide flaps 50 are interrupted from turning upward from the position of FIG. 2 by a guide member of the document feeding path 32 or the bidirectional path 39, for example. After the guide flaps 50 are pivoted downward to a position for guiding the document to the bidirectional path 39 (lower position), the guide flaps 50 are interrupted from further pivoting downward from the lower position by a guide member of the document feeding path 32 or the bidirectional path 39, for example. When the guide flaps 47 are at the position of FIG. 2 (upper position), a part of the document feeding path 32 on the scanning position side (left-hand side in FIG. 2) of the connecting position 38 is connected to a part of the document feeding path 32 on the output tray 31 side (right-hand side in FIG. 2) of the connecting position 38. With this feeding path configuration, the document sheet fed in the lower part 32C of the document feeding path 32 after passing across the scanning position is guided through the connecting position 38 toward the output tray 31. On the other hand, when the guide flaps 50 are pivoted downward from the position of FIG. 2, a part of the lower part 32C of the document feeding path 32 just on the downstream side of the scanning position is connected to the bidirectional path 39 at the connecting position 38. With this feeding path configuration, the document fed in the lower part 32C of the document feeding path 32 after passing across the scanning position is guided to enter the bidirectional path 39 at the connecting position 38. As above, the guide flaps 50 are provided at the connecting position 38 to be capable of guiding the document (fed from the scanning position) either to the document feeding path 32 (i.e. to the output tray 31) or to the bidirectional path 39.

As shown in FIG. 2, the document feeding path 32 and the bidirectional path 39 are provided with a plurality of sensors for detecting the document being fed therein. Specifically, in the document feeding path 32, a first sensor 52 and a second sensor 53 are placed on the upstream side and downstream side of the separation roller 34, respectively, and a lead sensor 54 is placed just on the upstream side of the scanning position. In the bidirectional path 39, a third sensor 55 is placed between the connecting position 38 and the intersecting position 40. Each of the sensors 52-55 is a so-called optical sensor which detects the rotation of a sensor rod (generally projecting into the document feeding path 32 or the bidirectional path 39 and withdrawing when in contact with the document) as the ON/OFF state of a photo interrupter.

When at least a document is set on the input tray 30 with its leading edge (in the feeding direction) contacting the separation roller 34, the first sensor 52 turns ON. Thus, whether there exists a document set on the input tray 30 or not is detected based on the ON/OFF state of the first sensor 52.

The second sensor 53 (placed just on the downstream side of the separation roller 34) is a sensor for detecting the length of the document (in the feeding direction) being fed in the document feeding path 32, based on its ON/OFF state. The distance between the second sensor 53 and the connecting position 38 along the document feeding path 32 is longer than the length (in the feeding direction) of (the long side of) a maximum-size document allowing the MFD 1 to execute the double-side scanning. In other words, the second sensor 53 is placed on the upstream side of the connecting position 38 of the document feeding path 32 to be at least the long-side length (in the feeding direction) of the maximum-size document (allowing for the double-side scanning) apart from the connecting position 38 along the document feeding path 32. Therefore, whether the document is longer than a prescribed length (in the feeding direction) or not can be judged by checking whether or not the trailing part of the document in the feeding direction is still being detected by the second sensor 53 at the point when the leading edge of the document sheet in the feeding direction reaches a prescribed position on the upstream side of the connecting position 38 of the document feeding path 32. Incidentally, in the MFD 1 of this embodiment, the maximum document size allowing for the double-side scanning (i.e. allowing the ADF 4 to feed the document to achieve the double-side scanning) is the A4 size (long-side length in the feeding direction: 297 mm).

Whether the double-side scanning is possible by the MFD 1 or not is judged based on whether the document feeding for the double-side scanning is possible by the ADF 4 or not. In the duplex scanning, the document after passing across the scanning position is guided to the bidirectional path 39, switched back (i.e. fed by means of the bidirectional feeding), and returned to the document feeding path 32 (on the upstream side of the scanning position) at the intersecting position 40. If a document having a greater length (in the feeding direction) than the feeding distance of the loop-shaped feeding path (starting from the intersecting position 40 of the document feeding path 32 and returning to the intersecting position 40 via the scanning position on the platen glass 21, the connecting position 38 and the bidirectional path 39) enters the bidirectional path 39 from the connecting position 38 of the document feeding path 32 and reaches the intersecting position 40, the leading edge of the document sheet in the feeding direction makes contact with the trailing part of the document itself and that can cause trouble (paper jam, damage to the document, etc.). Therefore, the document feeding by the ADF 4 for the duplex scanning is regarded to be impossible when the length of the document in the feeding direction is greater than the feeding distance of the loop-shaped feeding path. Incidentally, the purpose of the second sensor 53 is not necessarily restricted to the detection of the length of the document in the feeding direction; the second sensor 53 may also be used for other purposes (e.g. for judging whether the leading edge of the document sheet in the feeding direction has reached the feed roller 35B or not based on a detection signal from the second sensor 53 and the angle of rotation (or the number of revolutions) of a motor in order to execute the registration of the document).

The lead sensor 54 (placed just on the upstream side of the scanning position) is a sensor for detecting the leading edge and the trailing edge of the document sheet being fed in the document feeding path 32 based on its ON/OFF state. Whether or not the leading/trailing edge of the document sheet has reached the scanning position or a prescribed position on the upstream side of the connecting position 38 in the feeding direction can be judged by monitoring the number of revolutions of each feed roller 35A, 35B, 35D, 35D (based on the number of steps of an encoder or motor) since the detection of the leading/trailing edge of the document sheet by the lead sensor 54. The image scanning by the image scanner 22 is controlled according to a detection signal from the lead sensor 54, in which the image scanning is started when the leading edge of the document sheet reaches the scanning position and ended when the trailing edge of the document reaches the scanning position. Incidentally, the aforementioned detection of the presence/absence of the document by the second sensor 53 (for the judgment on the length of the document in the feeding direction) is carried out at the point when the leading edge of the document sheet in the feeding direction is judged to have reached the prescribed position on the upstream side of the connecting position 38 based on the detection signal from the lead sensor 54.

The third sensor 55 (placed between the connecting position 38 and the intersecting position 40 of the bidirectional path 39) is a sensor for detecting the leading edge or the trailing edge of the document sheet being fed in the bidirectional path 39 based on its ON/OFF state. For example, whether the trailing edge of the document sheet has passed the intersecting position 40 or not is judged by monitoring the number of revolutions of each of the reversible roller 43 and the feed rollers 35A-35D (based on the number of steps of an encoder or motor) since the detection of the trailing edge of the document sheet by the third sensor 55. By placing the third sensor 55 on the upstream side of the reversible roller 43 (in the feeding direction) to be relatively close to the reversible roller 43, the accuracy of the document feeding by the reversible roller 43 can be increased compared to a method monitoring the trailing edge of the document based on the detection signal from the lead sensor 54, etc.

Figure 3:
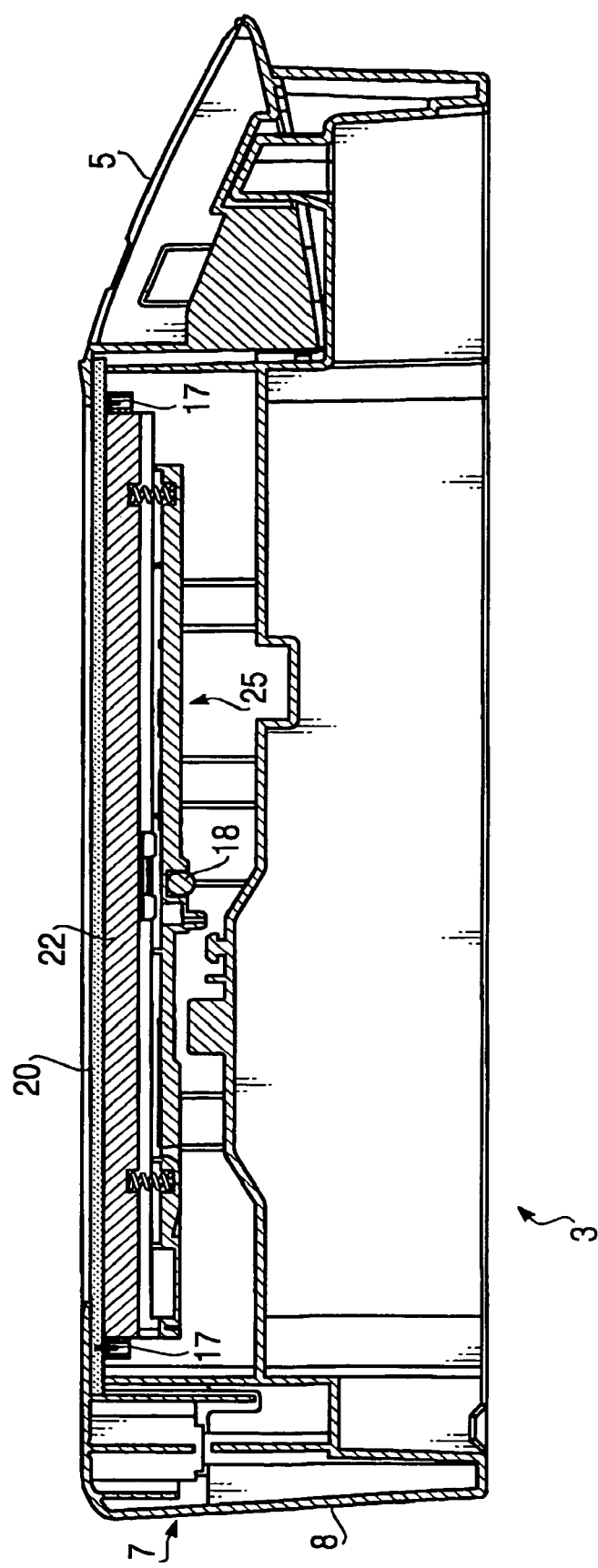
FIG. 3 is a schematic sectional view showing the general composition of a scanner unit of the MFD.

Next, the composition of the image reading unit 3 will be explained in detail. As shown in FIGS. 1-3, the image reading unit 3 is provided with the document placing table 7 which functions as a flatbed scanner (FBS). FIG. 3 is a schematic sectional view showing the general composition of the image reading unit 3. The document placing table 7 is a part of the body of the MFD 1 while forming a part of the top of the MFD 1 when the document cover 6 is opened. Two panes of platen glass 20 and 21 (see FIG. 2) are placed at the top of the document placing table 7. Thus, when the document cover 6 is opened, the platen glass 20 and 21 are exposed as the top surface of the document placing table 7. When the document cover 6 is closed as shown in FIG. 1, the top surface of the document placing table 7 (including the platen glass 20 and 21) is totally covered by the document cover 6. In the closed state, the document cover 6 forms a part of the top of the MFD 1.

As shown in FIG. 3, the document placing table 7 includes a body frame 8 in a shape like a rectangular parallelepiped, the platen glass 20 and 21 (see FIG. 2) provided at the top of the body frame 8, and the image scanner 22 installed in the body frame 8. The body frame 8 forms a part of the body of the MFD 1. The image scanner 22 is placed inside the body frame 8 to face the back of the platen glass 20 and 21. The image scanner 22 is supported by a carriage 25 to be movable in a direction (sub scanning direction) orthogonal to the depth direction (main scanning direction) of the MFD 1.

The platen glass 20 is a plate made of transparent glass, for example. On the platen glass 20, a document is set when the image reading unit 3 is used as a flatbed scanner (FBS). At the center of the top of the document placing table 7, an opening for exposing the platen glass 20 is formed and the platen glass 20 is fit in the opening to expose its front side. The whole of the front side of the platen glass 20 serves as a document scanning area.

Meanwhile, the platen glass 21 (a plate made of transparent glass, for example) serves as the scanning position when an image on a document fed by the ADF 4 is scanned by the image scanner 22. The platen glass 21 is placed to extend in the depth direction of the MFD 1 to cover the whole length of the image scanner 22 in the main scanning direction.

Between the two panes of platen glass 20 and 21, a positioning member 23 is placed. The positioning member 23 is a member like a long flat plate extending in the depth direction of the MFD 1 similarly to the platen glass 21. The positioning member 23 serves as a reference scale to be used for determining the position of the document set on the platen glass 20 (document setting plane of the flatbed scanner) when the image reading unit 3 is used as the flatbed scanner. Thus, the top of the positioning member 23 is provided with marks representing the central position and positions of both ends of documents in various sizes (A4 size (210 nm×297 mm), B5 size (182 mm×257 mm), A5 size (148 mm×210 mm), etc.). The top of the positioning member 23 is formed as a guide surface for scooping up the document (being fed to slide on the positioning member 23) so as to return the document to the inside of the ADF 4.

As shown in FIGS. 2 and 3, the image scanner 22 (placed to face the back of the platen glass 20 and 21), the carriage 25 (supporting the image scanner 22), a guide shaft 18, roller units 17, etc. are provided inside the document placing table 7. The guide shaft 18 is placed to extend in a direction (sub scanning direction) orthogonal to the sheet of FIG. 3. The carriage 25, being linked to the guide shaft 18, is supported to be freely slidable in the direction (sub scanning direction) orthogonal to sheet of FIG. 3. The carriage 25, linked with an existing belt drive mechanism (sub scanning mechanism), supports the image scanner 22 beneath the platen glass 20 and 21 to be able to move the image scanner 22 in the sub scanning direction (orthogonal to the depth direction of the MFD 1). When the carriage 25 is driven by driving force transmitted from a motor (via the existing belt drive mechanism) to move to and fro in the sub scanning direction (rightward and leftward in FIG. 2) in parallel with the platen glass 20 and 21, the image scanner 22 similarly moves to and fro in the sub scanning direction.

The roller units 17 are provided on both sides of the image scanner 22 as shown in FIG. 3. Roller surfaces of the roller units 17 constantly make contact with the back of the platen glass 20. Thus, when the image scanner 22 moves in the sub scanning direction (orthogonal to the sheet of FIG. 3, rightward and leftward in FIG. 2) according to the to-and-fro movement of the carriage 25, rollers of the roller units 17 roll along the platen glass 20. Thanks to the roller units 17, the image scanner 22 can smoothly move along the platen glass 20 even when the image scanner 22 is pressed against the back of the platen glass 20. The roller units 17 also serve for maintaining a constant distance between the platen glass 20 and the image scanner 22. Therefore, even when the image scanner 22 is equipped with a CIS (Contact Image Sensor) of a shallow focal depth, the image on the document set on the platen glass 20 can be scanned finely by the image scanner 22.

The image scanner 22 is a line image sensor whose main scanning direction is in the depth direction of the MFD 1. Specifically, the image scanner 22 in this embodiment is a CIS (Contact Image Sensor) of a close contact type, including a light source, a lens (for applying light emitted from the light source to the document via the platen glass 20, 21 while condensing reflected light from the document) and a photoreceptor element (such as a linear photo sensor, for receiving the light condensed by the lens and converting the received light into an electric signal) in one body. The image scanner 22 scans the image on the document according to a scan timing signal and a scan condition signal supplied from a CPU (Central Processing Unit) 101 of the MFD 1. Incidentally, the image scanner 22 can also be implemented by an image sensor other than a CIS (Contact Image Sensor), such as a CCD (Charge-Coupled Device) image sensor, CMOS (Complementary Metal Oxide Semiconductor) image sensor, etc. employing a reducing optical system.

Figure 4:
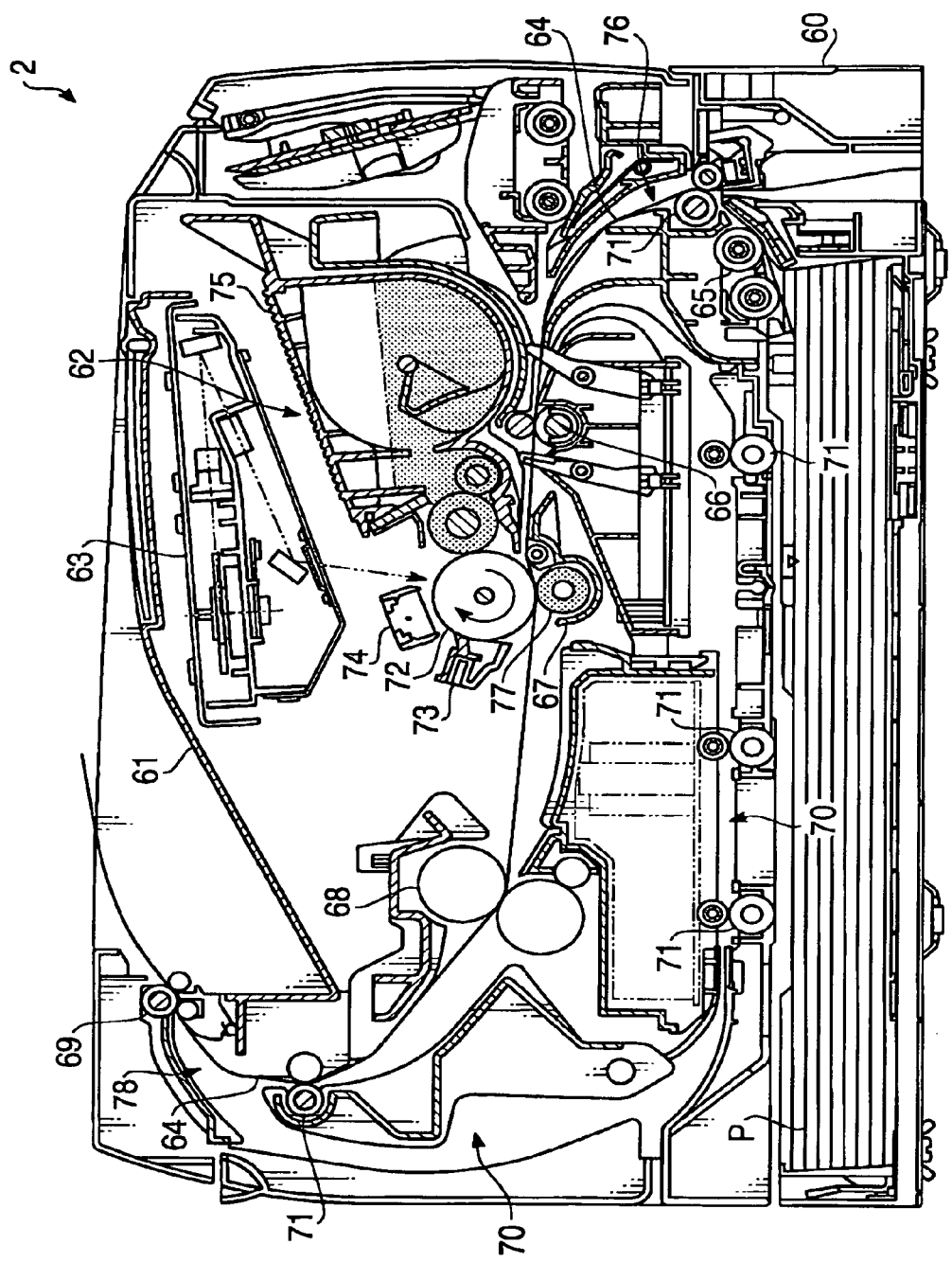
FIG. 4 is a schematic sectional view showing the composition of a printer unit of the MFD.

FIG. 4 is a schematic sectional view showing the composition of the printer unit 2. The outline of the internal composition of the printer unit 2 will be described below referring to FIG. 4.

The printer unit 2 is a unit for executing an image formation process by means of the so-called electrophotographic technology. The printer unit 2 includes a sheet supply cassette 60 placed at the bottom of the printer unit 2, a sheet output tray 61 placed at the top front of the printer unit 2, a process unit 62, a laser scanning unit 63, and a sheet feeding path 64 in a shape like a letter "S" laid down (for feeding a sheet from the front of the sheet supply cassette 60 to the rear of the sheet output tray 61). Along the sheet feeding path 64 (from the sheet supply cassette 60 side), a sheet supply roller 65, a registration roller 66, an image transfer unit 67, a fixation unit 68 and an ejection roller 69 are placed in successive turns. The printer unit 2 further includes a reversing feeding path 70 for feeding the sheet (after the printing on its first side in the double-side printing) in the manner of switchback feeding and returning the sheet to the sheet feeding path 64 on the upstream side of the process unit 62. The reversing feeding path 70 is formed to feed the sheet from the rear of the printer unit 2 to a point on the upstream side of the process unit 62 via a path just above the sheet supply cassette 60. The sheet feeding path 64 and the reversing feeding path 70 are properly provided with feed rollers 71.

The process unit 62 includes a photoconductor drum 72 placed to face the image transfer unit 67 across the sheet feeding path 64. Around the photoconductor drum 72 (from the image transfer unit 67 side), an electrically conductive brush 73, an electrification unit 74 and a development unit 75 are placed in successive turns in the rotation direction of the photoconductor drum 72. Incidentally, the image formation process employed by the printer unit 2 is not restricted to the electrophotographic image formation process; other processes (inkjet image formation process, thermal (thermosensitive) image formation process, etc.) may also be employed.

In the printer unit 2 configured as above, when image data transmitted by means of facsimile communication is received via a transmission channel (e.g. telephone circuit), a motor is activated. The driving force of the motor is transmitted to the above driving mechanism (including the photoconductor drum 72, the sheet supply roller 65, the feed rollers 71, the ejection roller 69, etc.), by which the driving mechanism is driven to rotate the rollers, etc. The surface of the photoconductor drum 72 rotated by the driving force is electrified by the electrification unit 74 up to prescribed voltage (e.g. several hundred volts). Meanwhile, the received image data is transferred to the laser scanning unit 63 via a buffer, etc. The laser scanning unit 63 generates a laser beam modulated according to the transferred image data and scans (sweeps) the laser beam on the surface of the photoconductor drum 72 (charged at the prescribed voltage) by use of a polygon mirror, etc., by which an electrostatic latent image is formed on the photoconductor drum 72. When the electrostatic latent image on the photoconductor drum 72 rotated by the driving force reaches a position facing the development unit 75, a developing agent is applied on the electrostatic latent image by the development unit 75, by which the electrostatic latent image is developed.

In the sheet supply cassette 60, the uppermost recording sheet P is pulled out from the stack of sheets by the sheet supply roller 65 (rotated by the driving force) and is supplied to the sheet feeding path 64. When the recording sheet P fed along a curved part 76 of the sheet feeding path 64 (making a U-turn) reaches the image transfer unit 67, the sheet P is sandwiched between the photoconductor drum 72 and a transfer roller 77 (rotating at the same circumferential velocity as the photoconductor drum 72) to be fed further along the sheet feeding path 64 while being electrically charged, by which the image held on the surface of the photoconductor drum 72 is transferred to the first side of the recording sheet P.

As the photoconductor drum 72 rotates further after the image transfer by the image transfer unit 67, the developing agent remaining on the surface of the photoconductor drum 72 is removed by the electrically conductive brush 73 (placed to sweep the surface of the rotating photoconductor drum 72) on the downstream side of the image transfer unit 67 in the rotation direction.

The recording sheet P, with the first side holding the image transferred by the image transfer unit 67, is fed to the fixation unit 68 placed on the downstream side in the feeding direction. In the fixation unit 68, the recording sheet P holding the image (developing agent) thereon is pressed and heated between two rollers, by which the developing agent (image) is melted and fixed on the recording sheet P. By the above process, the image data received by the MFD 1 by facsimile communication is printed on the first side of the recording sheet P. Thereafter, the recording sheet P is fed to the ejection roller 69 via another curved part 78 of the sheet feeding path 64 and is ejected by the ejection roller 69 to the sheet output tray 61 with the first side facing downward.

Incidentally, when the MFD 1 is set to the copy mode (by pressing the copy mode key 16 on the operation panel 5) and a start button 12 is pressed by the user, image data obtained by the image scanner 22 by scanning an image on a document is transferred to the laser scanning unit 63, and the scanned image (scanned image data) is printed on the first side of the recording sheet P similarly to the above process.

When a double-side copy function has been selected by the user, the sheet P (after the printing on the first side) being ejected to the sheet output tray 61 by the ejection roller 69 is stopped, with its rear end (in the feeding direction) nipped by the ejection roller 69 and an opposing roller. Subsequently, the ejection roller 69 is rotated reversely and the recording sheet P is fed in the reverse direction. In this case, the leading edge of the recording sheet P (in the reverse feeding direction) is guided not to the sheet feeding path 64 but to the reversing feeding path 70. The sheet P is fed along the reversing feeding path 70 by the feed rollers 71 and thereafter flows into the sheet feeding path 64 at the point on the upstream side of the process unit 62 (specifically, on the upstream side of the sandwiching part between the photoconductor drum 72 and the transfer roller 77). By the above reverse feeding, the sheet P after the printing on the first side is fed again to the process unit 62 with its second surface facing the photoconductor drum 72. In the process unit 62, an image is printed on the second side of the sheet P similarly to the above process, and the sheet P after the printing on both sides is finally ejected to the sheet output tray 61 (with the first side facing upward and the second side facing downward). Incidentally, in cases where the sheet P is desired to be ejected to the sheet output tray 61 with its first side facing downward also in the double-side copying, the sheet P after the printing on the second side (i.e. after the double-side copying) may be guided again to the reversing feeding path 70, fed in the sheet feeding path 64 with no printing operation by the process unit 62, and ejected to the sheet output tray 61 (with the first side facing downward).

Figure 5:
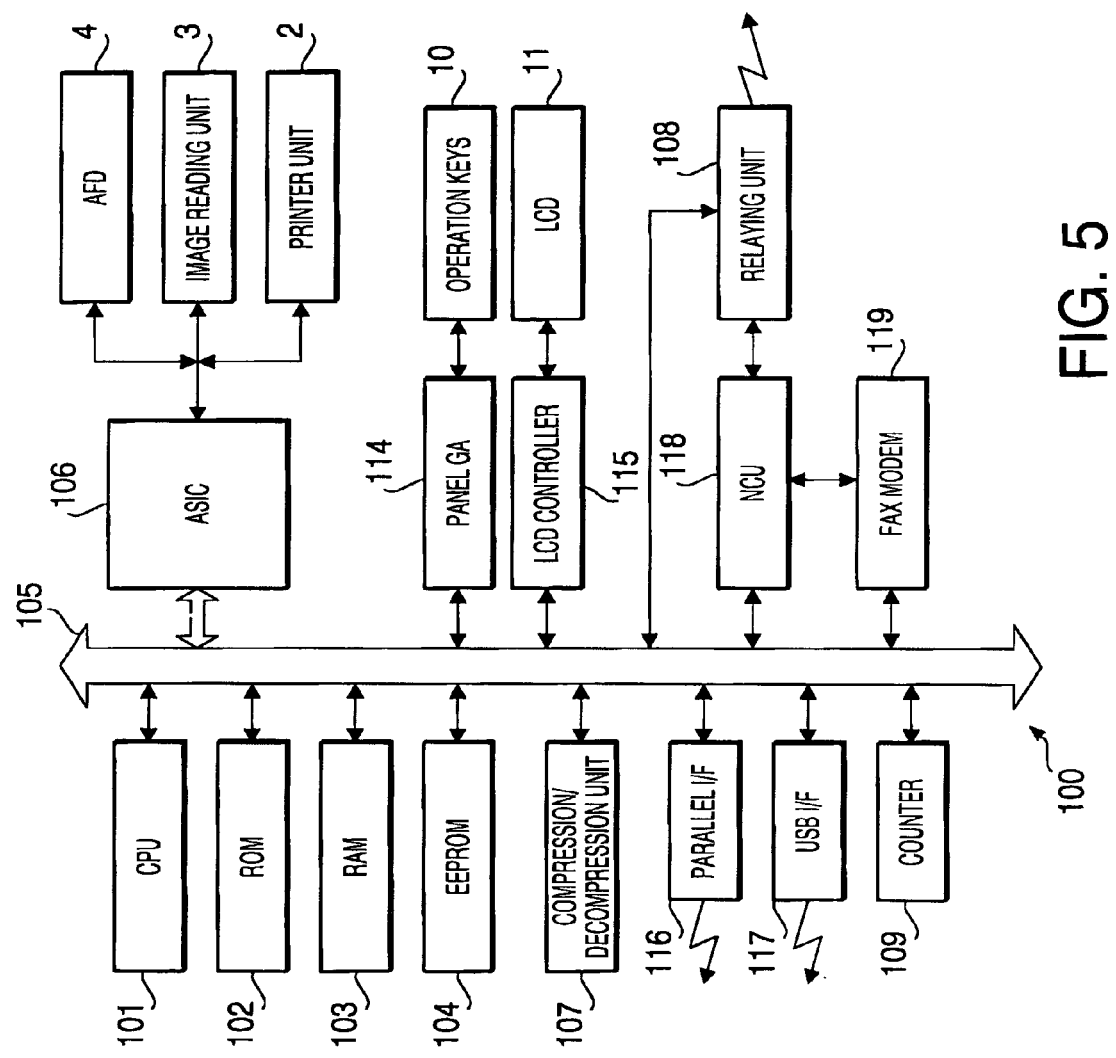
FIG. 5 is a block diagram showing the general composition of a control unit of the MFD.

Next, the control unit 100 for controlling the operation of the MFD 1 will be explained in detail referring to FIG. 5. FIG. 5 is a block diagram showing the general composition of the control unit 100. As shown in FIG. 5, the control unit 100 is configured as a microcomputer which includes the aforementioned CPU (Central Processing Unit) 101, a ROM (Read Only Memory) 102, a RAM (Random Access Memory) 103 and an EEPROM (Electrically Erasable and Programmable ROM) 104 as main components. The CPU 101, the ROM 102, the RAM 103 and the EEPROM 104 are connected to an ASIC (Application-Specific Integrated Circuit) 106 via a bus 105.

The ROM 102 stores programs for implementing various functions of the MFD 1 and controlling the operation of the components of the MFD 1. The RAM 103 is used as a storage area for temporarily storing various data used by the CPU 101 during the execution of the programs and as a developing area for developing data and programs. The RAM 103 is also used as image memory for temporarily storing image data of a scanned document. The EEPROM 104 stores various data to be used for processes which are executed according to the programs.

The CPU 101 is a computing unit for centralized control of peripheral control devices of the control unit 100 and devices in the driving mechanism of the MFD 1. By the CPU 101, the programs stored in the ROM 102 and the data stored in the RAM 103 and the EEPROM 104 are read out and computation according to the programs is executed, by which a process according to steps shown in flow charts of FIGS. 6 and 7 (explained later) is implemented.

Further, a compression/decompression unit 107, a panel gate array (panel GA) 114, an LCD controller 115, an NCU (Network Control Unit) 118, a FAX modem 119, a relaying unit 108 and a counter 109 are connected to the bus 105.

The compression/decompression unit 107 is an integrated circuit (LSI, VLSI, etc.) into which a compression circuit, decompression circuit, internal memory, etc. are integrated. The compression circuit executes at least a lossy compression process (irreversible compression process) successively to image data of a prescribed number of lines (e.g. 8 lines) which are successively inputted to the compression/decompression unit 107. Specifically, the compression circuit can be a circuit executing an image compression process according to the JPEG format, for example. Meanwhile, the decompression circuit successively decompresses compressed image data which are successively inputted to the compression/decompression unit 107.

The ASIC 106 is connected with the printer unit 2, the image reading unit 3 and the ADF 4. The ASIC 106 controls and drives the printer unit 2, image reading unit 3 and ADF 4 by generating control signals (for controlling the driving mechanisms of the printer unit 2, image reading unit 3 and ADF 4) and sending the control signals respectively to the printer unit 2, image reading unit 3 and ADF 4 according to instructions from the CPU 101. Incidentally, while the printer unit 2, the image reading unit 3 and the ADF 4 are controlled by the ASIC 106 in this embodiment, it is of course possible to control them by means of software programs executed by the CPU 101, instead of using a hardware logic circuit like the ASIC 106.

The panel gate array 114 controls the various operation keys 10 (the start button, stop button, etc.) on the operation panel 5 of the MFD 1. When an operation key 10 is pressed, a prescribed code signal corresponding to the pressed operation key 10 is outputted by the panel gate array 114. Each operation key 10 has previously been assigned a particular key code. When a code signal representing a certain key code is received from the panel gate array 114, the CPU 101 executes a necessary control process according to a prescribed key processing table. The key processing table, as a table associating each key code with a control process, has been prestored in the EEPROM 104, for example.

The LCD controller 115, as a controller for display control of the LCD (Liquid Crystal Display) 11, is implemented by an integrated circuit such as an LSI or VLSI, for example. The LCD controller 115 controls the LCD 11 according to instructions from the CPU 101 to let the LCD 11 display a variety of information (information on the operation of the printer unit 2 and the image reading unit 3, error information, setting information, etc.).

The FAX modem 119 (so-called G3 FAX modem) is a modem for analog lines. The FAX modem 119 (as a modulator-demodulator) modulates a digital signal into an analog signal suitable for the properties of a transmission channel to which the FAX modem 119 is connected and transmits the analog signal to a communication terminal (facsimile machine, etc.) via the transmission channel, while receiving an analog signal from a communication terminal via the transmission channel and demodulating the analog signal into a digital signal. Incidentally, a modem supporting the Group 3 standard (G3: international facsimile transmission standard for analog lines) or the Group 4 standard (G4: international facsimile transmission standard for digital lines (e.g. ISDN)) is employed as the FAX modem 119 depending on the specifications of the transmission channel to which the FAX modem 119 is connected.

The NCU 118 is a network control unit for executing various procedures (line connection, notification of a destination telephone number (FAX number), disconnection, alteration of the destination, etc.) necessary for the connection of the MFD 1 to the transmission channel (e.g. telephone circuit) by communicating with an exchange (switch). The facsimile communication according to the facsimile transmission protocol in conformity with the ITU-T recommendations is carried out by the NCU 118. Communication control (facsimile control) in accordance with the present invention is implemented by the NCU 118 and the FAX modem 119.

The relaying unit 108 is a unit which receives an MCF (Message Confirmation) signal transmitted from a communication terminal (on the other side of a connection) via the transmission channel and selectively transfers (relays) the received MCF to the NCU 118. Specifically, the relaying unit 108 is configured as an integrated circuit including various electronic devices (comparator, internal memory, A/D (analog-to-digital) converter, computing element, etc.). Signal data "x0110001" representing the MCF has been prestored in the internal memory. The signal data "x0110001" is inputted to an input port of the comparator by the computing element while a signal received via the transmission channel is inputted to the other input port of the comparator. The comparator compares the two signals inputted to the two input ports and notifies the CPU 101 of the result of the comparison (i.e. judgment on whether or not the two signals coincide with each other). When the two signals are judged by the comparator to coincide with each other, it means that the MCF has been received via the transmission channel. In this case, the transfer of the MCF to the NCU 118 is selectively interrupted by the relaying unit 108 depending a value (count) held by the counter 109. On the other hand, when the two signals do not coincide with each other, the received signal is directly transferred to the NCU 118 via the relaying unit 108. The interruption of the MCF can be implemented by, for example, placing a suitable filter in a signal path on the NCU 118 side and removing the MCF (being transferred to the NCU 118) with the filter by changing a filtering coefficient of the filter when the received signal is judged to be the MCF. The method of interrupting the MCF transferred to the NCU 118 is of course not restricted to the above method; various methods may be employed as long as the interruption can be achieved.

The counter 109 includes a counter circuit for counting the number of MCFs received from the terminal on the other side of the connection. The counter 109 is used for steps S17 and S18 (see FIG. 7) which will be explained later. The count, incremented on each reception of the MCF, is stored in internal memory of the counter 109. When a reset signal is supplied from the CPU 101 to the counter 109, the internal memory of the counter 109 is initialized, that is, the count is reset. Incidentally, the counting of the received MCFs may also be implemented by software (counter program) instead of using the hardware counter 109.

Further, a parallel interface 116 and a USB interface 117, for letting the MFD 1 execute data communication with an existing computer (e.g. PC) via a parallel cable or a USB cable, are connected to the bus 105.

In the following, the document feeding operation by the ADF 4 and the image scanning operation (scanning of each document sheet Gn) by the image scanner 22 will be explained. While the image reading unit 3 can be used either with the ADF 4 or as a flatbed scanner (FBS), detailed explanation of the operation of the image reading unit 3 as the flatbed scanner will be omitted since the use of the flatbed scanner is not particularly relevant to the present invention.

For the scanning of a document image by use of the ADF 4, the document cover 6 is closed to cover the document placing table 7. The open/close state of the document cover 6 is detected by a sensor, etc. installed in the document placing table 7, and the MFD 1 is controlled to activate the ADF 4 when the document cover 6 is closed. When the ADF 4 is used, one or more documents to be scanned are set on the input tray 30. For the scanning of a plurality of documents of the same size, the documents are stacked up with the first side of the first document facing upward (i.e. face up), neatly aligned, and set on the input tray 30.

When a scanning start instruction is inputted, the motor is activated, by which the pick-up roller 33, the separation roller 34, the feed rollers 35A, 35B, 35C and 35D, the ejection roller 36 and the reversible roller 43 are driven and rotated properly with prescribed timing. Meanwhile, the arm 29 supporting the pick-up roller 33 is moved down to let the pick-up roller 33 contact and press down the first document sheet G1 set on the input tray 30, by which the uppermost document (directly receiving the torque of the pick-up roller 33 and the separation roller 34) is separated from the stack of documents one by one and is supplied to the document feeding path 32. The supplied document is fed and guided by the document feeding path 32 to the scanning position, at which an image on the document is scanned by the image scanner 22 which has been on standby under the scanning position. Each document after completion of image scanning is ejected to the output tray 31. In the image scanning operation, the document feeding path for the double-side scanning differs from that for the single-side scanning. The selection between the single-side scanning and the double-side scanning is made based on the scanning mode (single-side scanning mode, double-side scanning mode) previously set before the scanning start instruction is inputted. Setting information regarding the scanning mode is stored in the RAM 103 or a register of the CPU 101 and retained for a prescribed time period before and after the image scanning.

Figure 8:
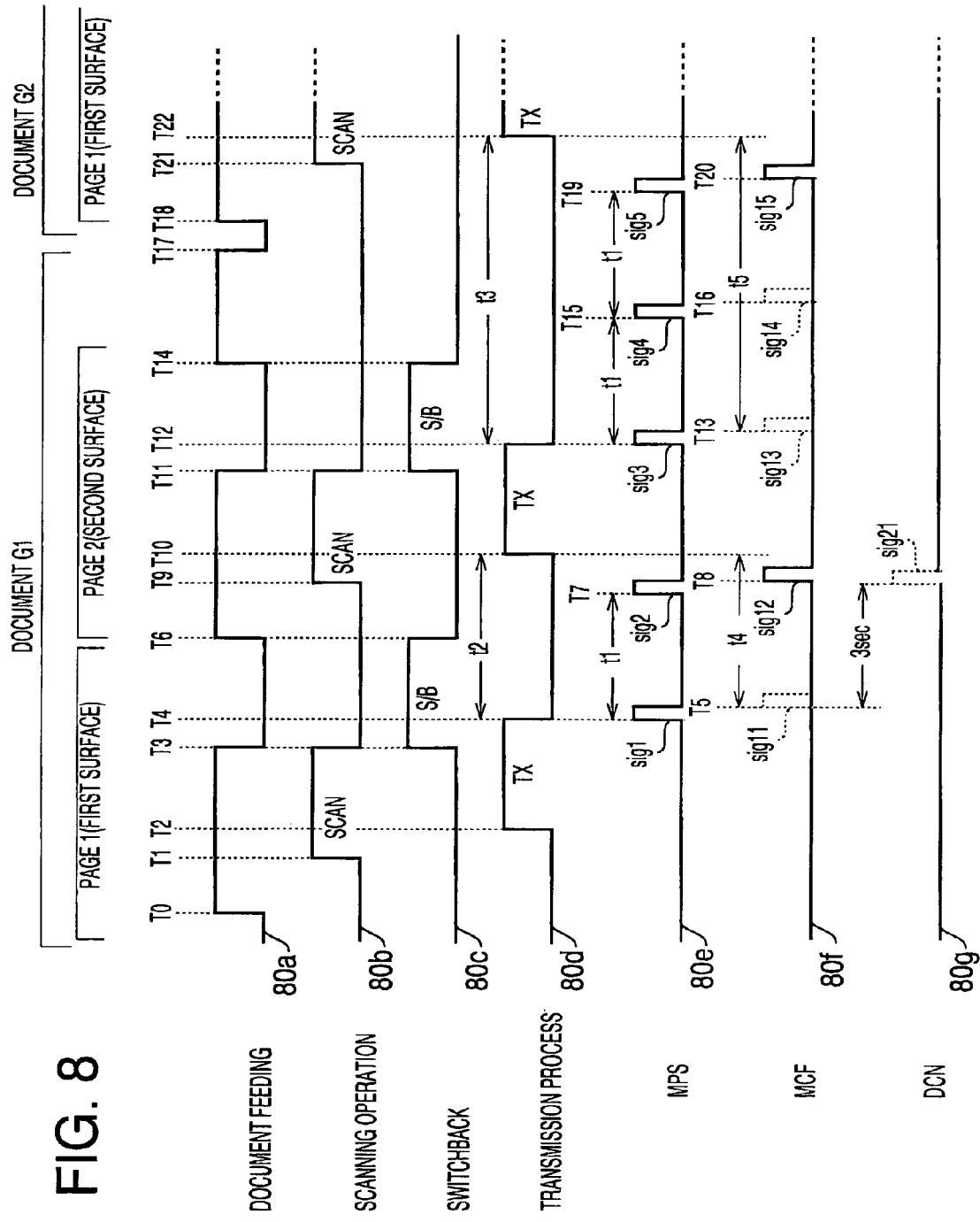
FIG. 8 is a timing chart showing the state of feeding of each document, etc.

In the following, the document feeding operation (for feeding a plurality of document sheets Gn) by the ADF 4 and the duplex (double-side) scanning operation (scanning of both sides of each document sheet Gn) by the image scanner 22, executed in the MFD 1 which has been set to the duplex scanning mode and the facsimile mode, will be explained in detail referring to FIGS. 8-15. FIG. 8 is a timing chart showing the state of feeding of each document sheet Gn, etc., wherein "80a" shows the state of the feeding of the document sheet Gn in the document feeding path 32, "80b" shows the scanning operation, "80c" shows the state of the bidirectional feeding of each document sheet Gn, "80d" shows a transmission process for transmitting the scanned image, "80e" shows an MPS (Multi Page Signal) signal, "80f" shows the MCF, and "80f" shows a DCN. FIGS. 9-15 are schematic diagrams for explaining the document feeding operation executed by the ADF 4 for the duplex scanning of each document sheet Gn, wherein a side of the document sheet indicated with "1" (surrounded by a triangle) is the first side which is scanned first, and a side of the document sheet indicated with "2" (surrounded by a semiellipse) is the second side (opposite to the first side) which is scanned later. When the MFD 1 has been set to the simplex (single-side) scanning mode, each document sheet Gn supplied from the input tray 30 is fed in the document feeding path 32 to make a U-turn and reaches the scanning position with the first side facing the image scanner 22. After the scanning of the first side, the document sheet Gn is ejected to the output tray 31. Detailed explanation of the simplex scanning operation is omitted since such an operation is well known and irrelevant to the present invention.

Figure 9:
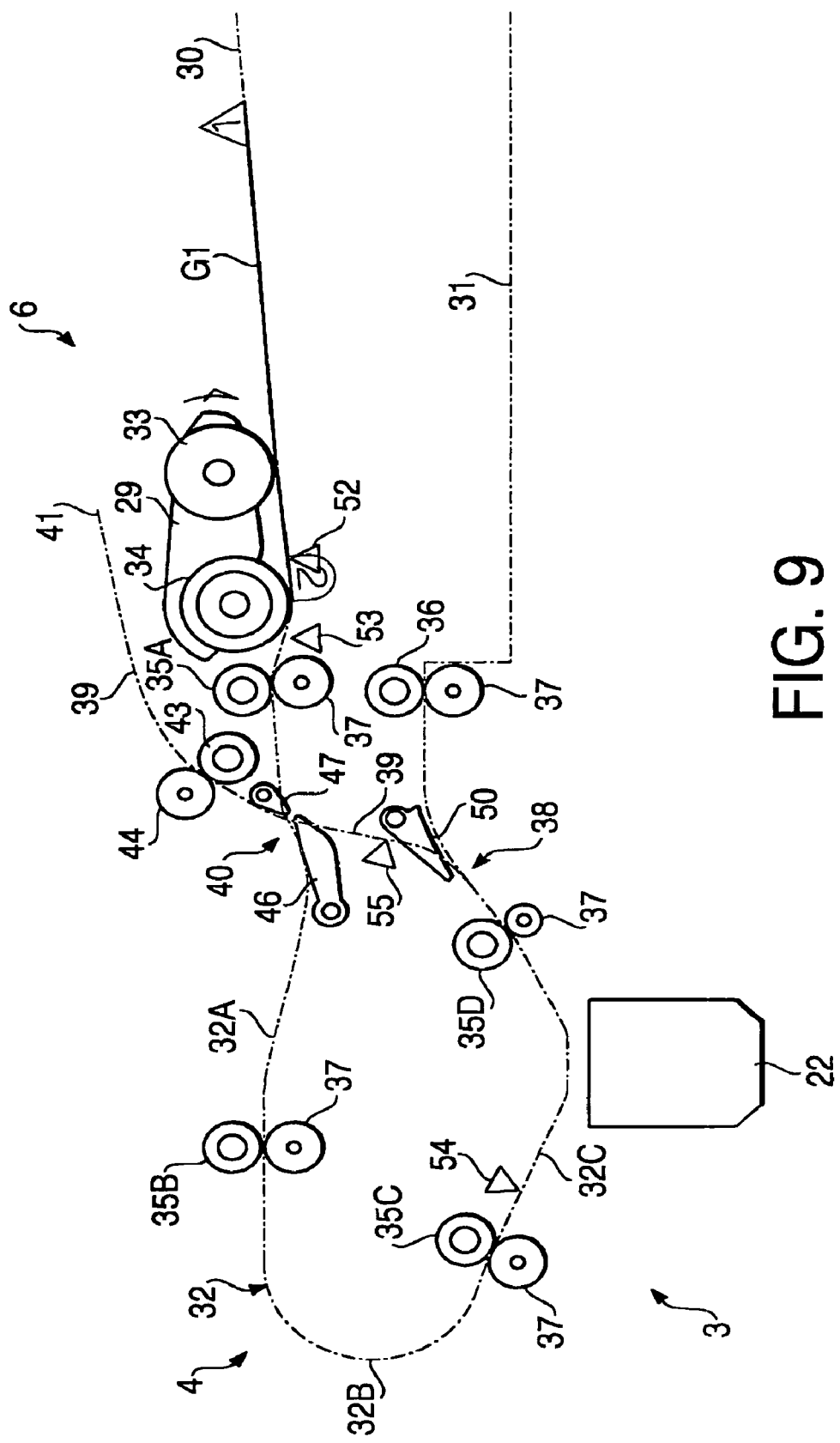
FIGS. 9-15 are schematic diagrams showing a document feeding operation executed by an ADF (Automatic Document Feeder) of the MFD for double-side scanning.

Before each document sheet Gn is supplied from the input tray 30, the guide flaps 50 at the connecting position 38 stay at the upper position for letting the document feeding path 32 continue from the scanning position to the output tray 31 as shown in FIG. 9. Meanwhile, at the intersecting position 40, the guide flaps 46 stay at the lower position for connecting the input tray 30 side part (right-hand side part) of the document feeding path 32 to the scanning position side part (left-hand side part) of the document feeding path 32 at the intersecting position 40, and the guide flaps 47 stay at the right-hand position for connecting the upper end 41 side part (upper part) of the bidirectional path 39 to the scanning position side part (left-hand side part) of the document feeding path 32 at the intersecting position 40.

When the scanning start instruction is inputted, the control unit 100 checks whether there exists a document sheet Gn set on the input tray 30 or not by use of the first sensor 52. When there exists no document sheet Gn on the input tray 30, the control unit 100 displays an error message "NO DOCUMENT" on the LCD 11 of the MFD 1. When there exists a stack of document sheets Gn set on the input tray 30, the control unit 100 activates the motor.

The driving force of the activated motor is transmitted to the arm 29, by which the arm 29 is moved down and the pick-up roller 33 makes contact with the uppermost document sheet G1 on the input tray 30. The driving force of the motor is also transmitted to the pick-up roller 33 and the separation roller 34 to rotate the rollers 33 and 34 in a feeding direction, by which the document sheet G1 is supplied to the document feeding path 32 and the document feeding is started (T0 in FIG. 8). When a plurality of document sheets Gn are set on the input tray 30, a second document sheet G2 just below the uppermost document sheet G1 can be picked up by the pick-up roller 33 together with the uppermost document sheet G1; however, the second document sheet G2 is stopped by the separation pad placed at the position opposing the separation roller 34. By the above operation, the document sheet G1 is supplied to the document feeding path 32.

In the document feeding path 32, the feed rollers 35A, 35B, 35C and 35D and the ejection roller 36 (to which the driving force of the motor is transmitted) rotate so as to feed each document sheet Gn in the feeding direction along the document feeding path 32. The document sheet G1 supplied from the input tray 30 to the document feeding path 32 is first nipped by the feed roller 35A and the pinch roller 37 and the torque of the feed roller 35A feeds the document sheet G1 to the intersecting position 40 of the document feeding path 32.

Incidentally, the second sensor 53 turns ON at the point when the document sheet G1 is supplied to the document feeding path 32.

Figure 10:
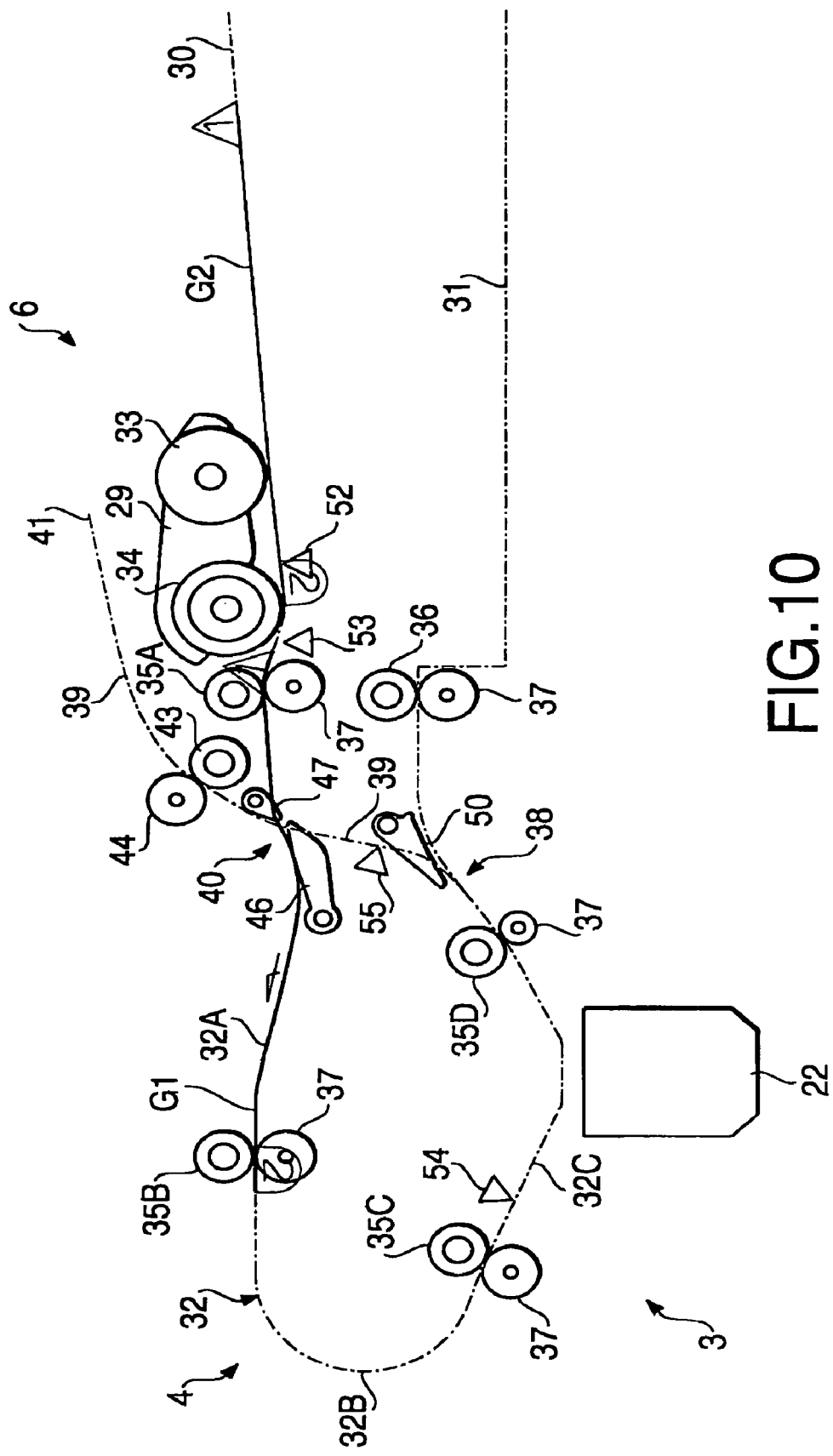

Since the guide flaps 47 have closed between the input tray 30 side part (right-hand side part) of the document feeding path 32 and the intersecting position 40, the document sheet G1 being fed to the intersecting position 40 makes contact with the guide flaps 47. In this case, the guide flaps 47 pressed by the document sheet G1 rotates leftward as shown in FIG. 10, by which the input tray 30 side part (right-hand side part) of the document feeding path 32 is connected to the scanning position side part (left-hand side part) of the document feeding path 32 at the intersecting position 40 while closing the feeding path branching off from the document feeding path 32 to the upper end 41 side part (upper part) of the bidirectional path 39. Meanwhile, the feeding path branching off from the document feeding path 32 to the connecting position 38 side part (lower part) of the bidirectional path 39 has already been closed by the guide flaps 46. Therefore, the document sheet G1 reaching the intersecting position 40 from the input tray 30 is guided by the guide flaps 46 and 47 to the scanning position side part (left-hand side part) of the document feeding path 32, without entering the upper part nor lower part of the bidirectional path 39.

Figure 11:
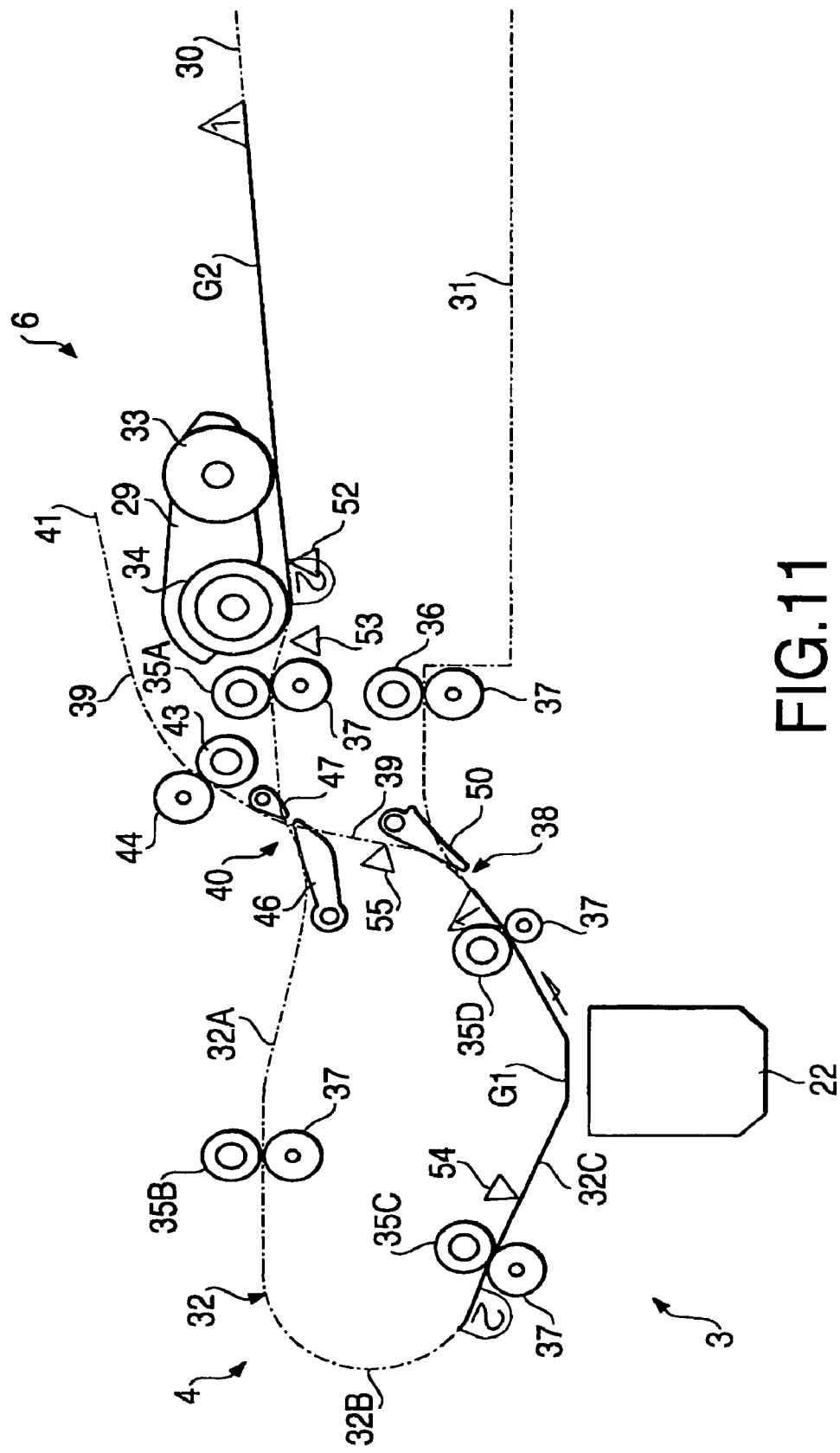

Subsequently, the document sheet G1 is fed through the curved part 32B of the document feeding path 32 while being turned over as shown in FIG. 11. The lead sensor 54 turns ON when it detects the leading edge of the document sheet G1 in the feeding direction. Since the leading edge of the document sheet G1 reaches the scanning position a prescribed time period after the detection by the lead sensor 54, the control unit 100 executes the scanning of the first side of the document sheet G1 by activating the image scanner 22 at the timing of arrival of the leading edge of the document sheet G1 at the scanning position (T1 in FIG. 8). Specifically, the document sheet G1 with the first side facing the image scanner 22 passes through the scanning position, at which the image on the first side of the document sheet G1 is scanned by the image scanner 22 line by line from the leading edge of the document sheet G1 in the feeding direction. Meanwhile, the transmission process for transmitting the scanned image (image data) is started (T2 in FIG. 8). In the transmission process, on each scanning of a prescribed number of lines (e.g. 8 lines) by the image scanner 22, a partial scanned image (image data corresponding to the prescribed number of lines) is transmitted successively to the destination terminal (FAX machine, PC, etc.) specified by the FAX number previously inputted or selected by the user. Such a transmission process is executed according to flow charts of FIGS. 6 and 7 as will be explained later.

The lead sensor 54 turns OFF when it detects the trailing edge of the document sheet G1 in the feeding direction (see FIG. 11). The control unit 100 makes the image scanner 22 end the image scanning of the first side of the document sheet G1 a prescribed time period after the turning OFF of the lead sensor 54 (T3 in FIG. 8).

After the transmission of the whole scanned image of the first side of the document sheet G1 is finished (T4 in FIG. 8) after the completion of the image scanning of the first side, an MPS "sig1" (see "80*e*" in FIG. 8) is transmitted by the NCU 118 to the destination terminal, by which the destination terminal is informed that there exists image data to be further transmitted from the MFD 1 (i.e. scanned image data of the next page). Incidentally, while the destination terminal receiving the MPS "sig1" from the MFD 1 immediately sends back an MCF "sig11" (see "80*f*" in FIG. 8) to the MFD 1 (T5 in FIG. 8), the MFD 1 of this embodiment ignores the MCF "sig11" transmitted from the destination terminal in response to the MPS "sig1" as will be explained later (see S19 in FIG. 7).

Figure 12:
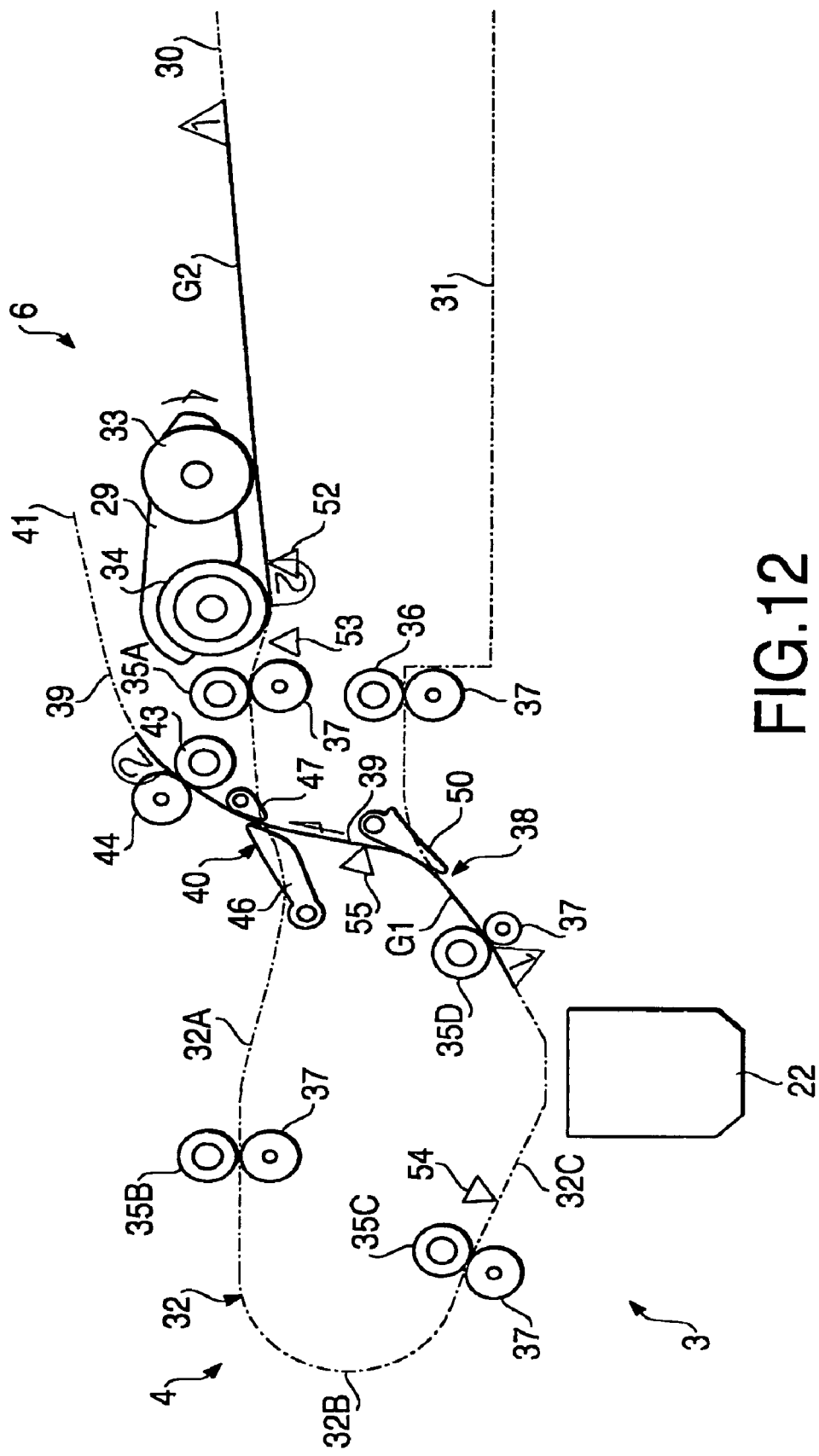

As shown in FIG. 12, the guide flaps 50 are moved to the lower position (for guiding the document sheet G1 to the bidirectional path 39) by the driving force of the motor before the leading edge of the document sheet G1 in the feeding direction reaches the connecting position 38. By the guide flaps 50 set at the lower position, the document sheet G1 reaching the connecting position 38 after the scanning of the first side is guided from the document feeding path 32 to the bidirectional path 39, by which the switchback feeding of the document sheet G1 is started (T3 in FIG. 8). In this case, the third sensor 55 turns ON when it detects the leading edge of the document sheet G1 entering the bidirectional path 39.

Since the guide flaps 46 have closed between the connecting position 38 side part (lower part) of the bidirectional path 39 and the intersecting position 40, the leading edge of the document sheet G1 entering the bidirectional path 39 makes contact with the guide flaps 46 before reaching the intersecting position 40. In this case, the guide flaps 46 pressed upward by the leading edge of the document sheet G1 fed in the bidirectional path 39 are turned to the upper position as shown in FIG. 12, by which the connecting position 38 side part (lower part) of the bidirectional path 39 is connected to the upper end 41 side part (upper part) of the bidirectional path 39 at the intersecting position 40 while closing the feeding path branching off to the scanning position side part (left-hand side part) of the document feeding path 32. Meanwhile, the feeding path branching off to the input tray 30 side part (right-hand side part) of the document feeding path 32 has already been closed by the guide flaps 47. Therefore, the document sheet G1 reaching the intersecting position 40 from the connecting position 38 side part (lower part) of the bidirectional path 39 is guided by the guide flaps 46 and 47 to the upper end 41 side part (upper part) of the bidirectional path 39, without entering the right-hand side part nor left-hand side part of the bidirectional path 39. Subsequently, the leading edge of the document sheet G1 in the feeding direction is nipped by the reversible roller 43 and the pinch roller 44 and the torque of the reversible roller 43 (pulling the document sheet G1 upward) feeds the document sheet G1 toward the upper end 41 of the bidirectional path 39.

Figure 13:
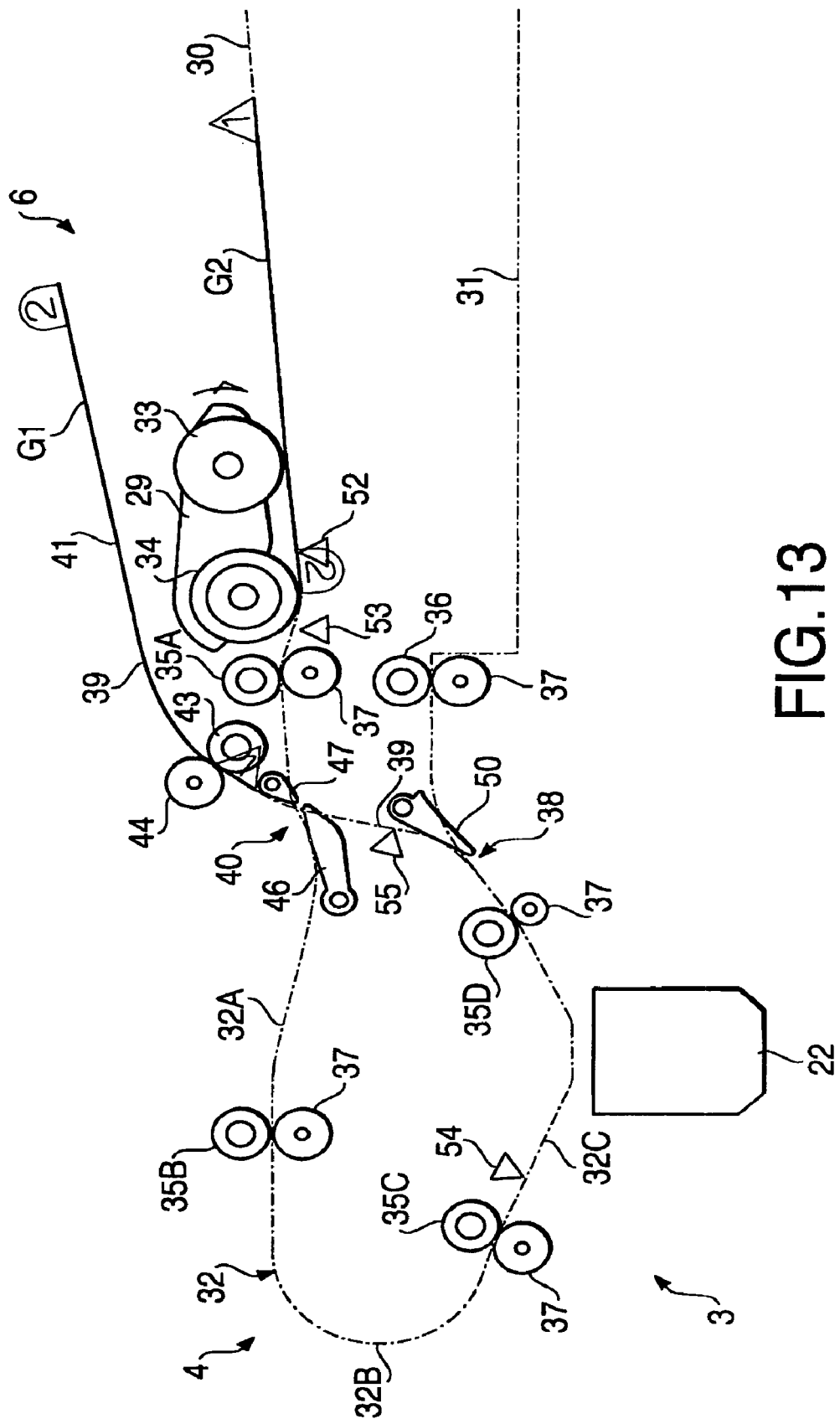

After the trailing edge of the document sheet G1 in the feeding direction has perfectly entered the upper end 41 side part (upper part) of the bidirectional path 39 across the intersecting position 40 as shown in FIG. 13, the control unit 100 reverses the rotation of the motor. In this case, the control unit 100 judges whether the trailing edge of the document sheet G1 has perfectly entered the upper end 41 side part (upper part) of the bidirectional path 39 across the intersecting position 40 or not based on a detection signal from the third sensor 55 and a feeding distance/time by the feed roller 35D and the reversible roller 43 counted after the reception of the detection signal, since the third sensor 55 turns OFF when it detects the trailing edge of the document sheet G1 in the feeding direction and the trailing edge passes across the intersecting position 40 a prescribed time period after the turning OFF of the third sensor 55. By the reversed rotation of the motor, the document sheet G1 which has been nipped by the reversible roller 43 and the pinch roller 44 to protrude from the upper end 41 is returned to the intersecting position 40.

Incidentally, even when a part of the document sheet G1 protrudes from the upper end 41 to the outside of the ADF 4, the protruding part is supported on the document supporting part 42 (without drooping down onto a stack of documents set on the input tray 30, for example). Incidentally, when the document sheet G1 being fed upward in the bidirectional path 39 and passing across the intersecting position 40 separates from the guide flaps 46, the guide flaps 46 spontaneously turn downward to the lower position.

Figure 14:
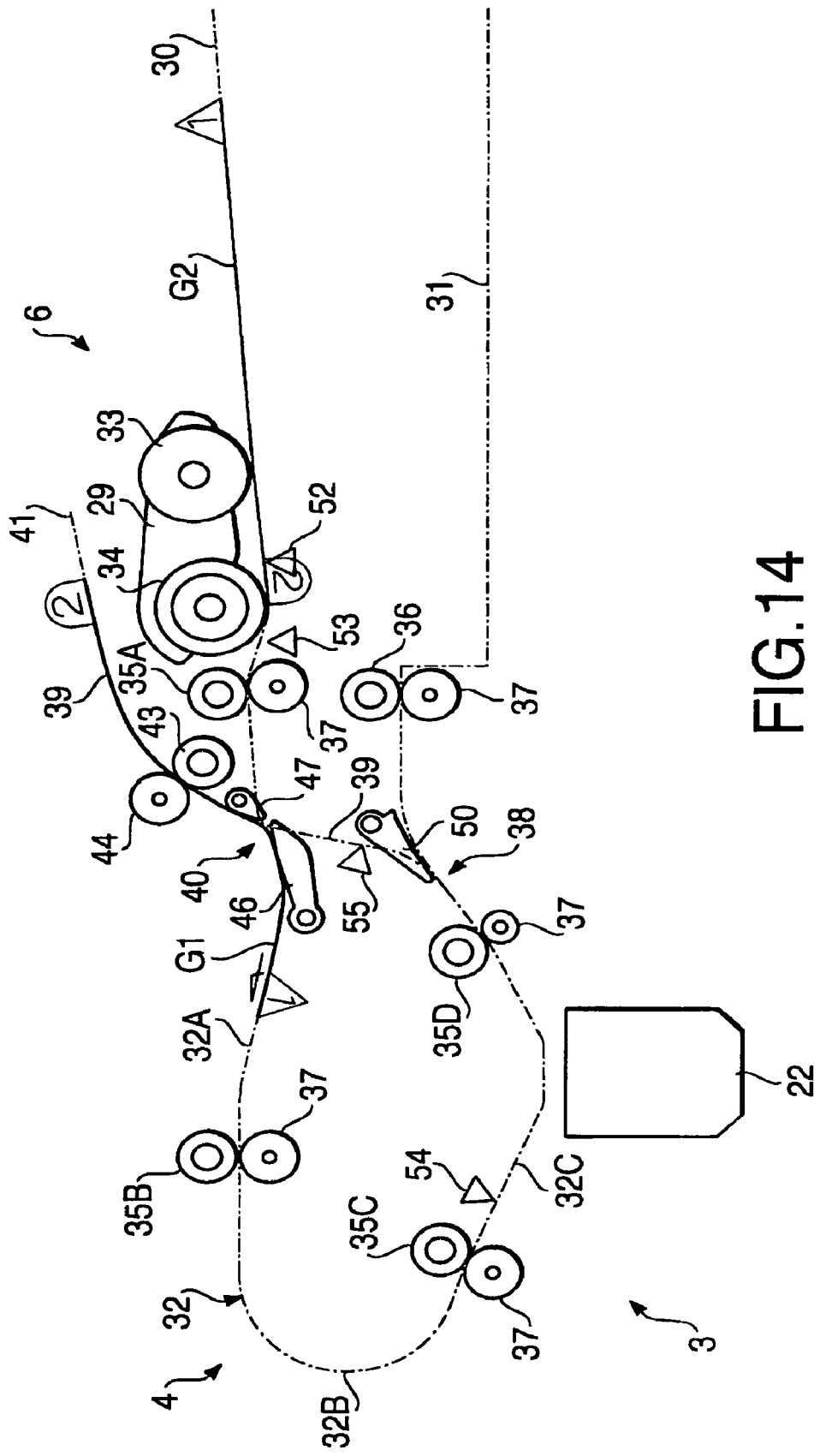

The document sheet G1 reversed by the bidirectional path 39 as above makes contact with the guide flaps 46 again at the intersecting position 40 as shown in FIG. 14. The guide flaps 46 are interrupted from turning downward from the lower position shown in FIG. 14, by which the upper end 41 side part (upper part) of the bidirectional path 39 is connected to the scanning position side part (left-hand side part) of the document feeding path 32 at the intersecting position 40 while closing the feeding path to the connecting position 38 side part (lower part) of the bidirectional path 39. Meanwhile, the feeding path branching off to the input tray 30 side part (right-hand side part) of the document feeding path 32 has already been closed by the guide flaps 47.

Therefore, the document sheet G1 reaching the intersecting position 40 from the upper end 41 side part (upper part) of the bidirectional path 39 is guided by the guide flaps 46 and 47 to the scanning position side part (left-hand side part) of the document feeding path 32, without entering the connecting position 38 side part (lower part) of the bidirectional path 39 nor the input tray 30 side part (right-hand side part) of the document feeding path 32. By the above bidirectional operation returning the document sheet G1 from the bidirectional path 39 to the document feeding path 32 on the upstream side of the scanning position, the document sheet G1 is fed again through the document feeding path 32 with its leading and trailing edges reversed from each other, that is, with its former rear end (the trailing edge when the document sheet G1 was first fed in the document feeding path 32) placed at the leading edge in the feeding direction (T6 in FIG. 8). After the above bidirectional operation, the document sheet G1 is fed through the document feeding path 32 so as to let the second side face the image scanner 22 at the scanning position.

Figure 15:
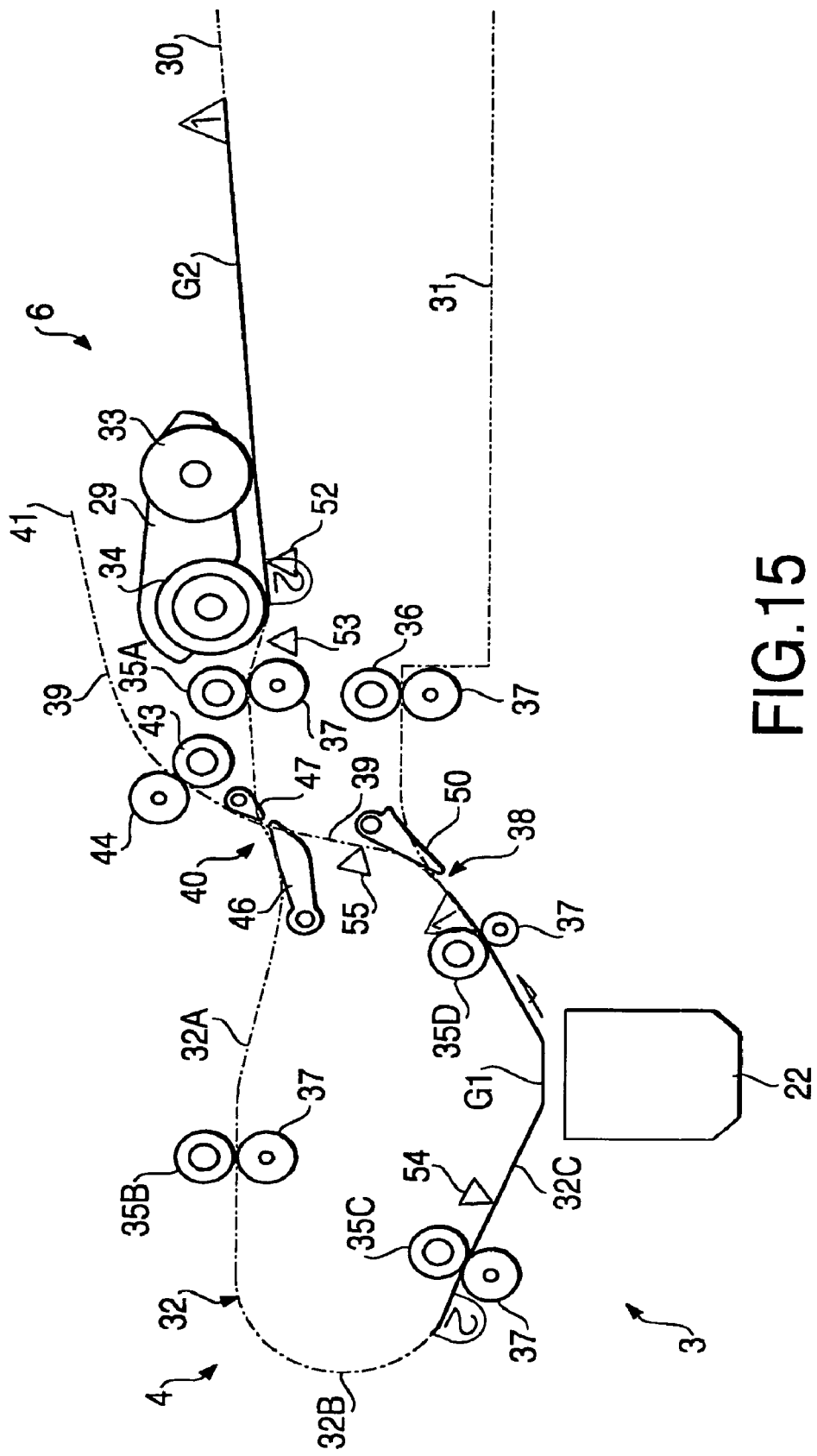
Figure 16:
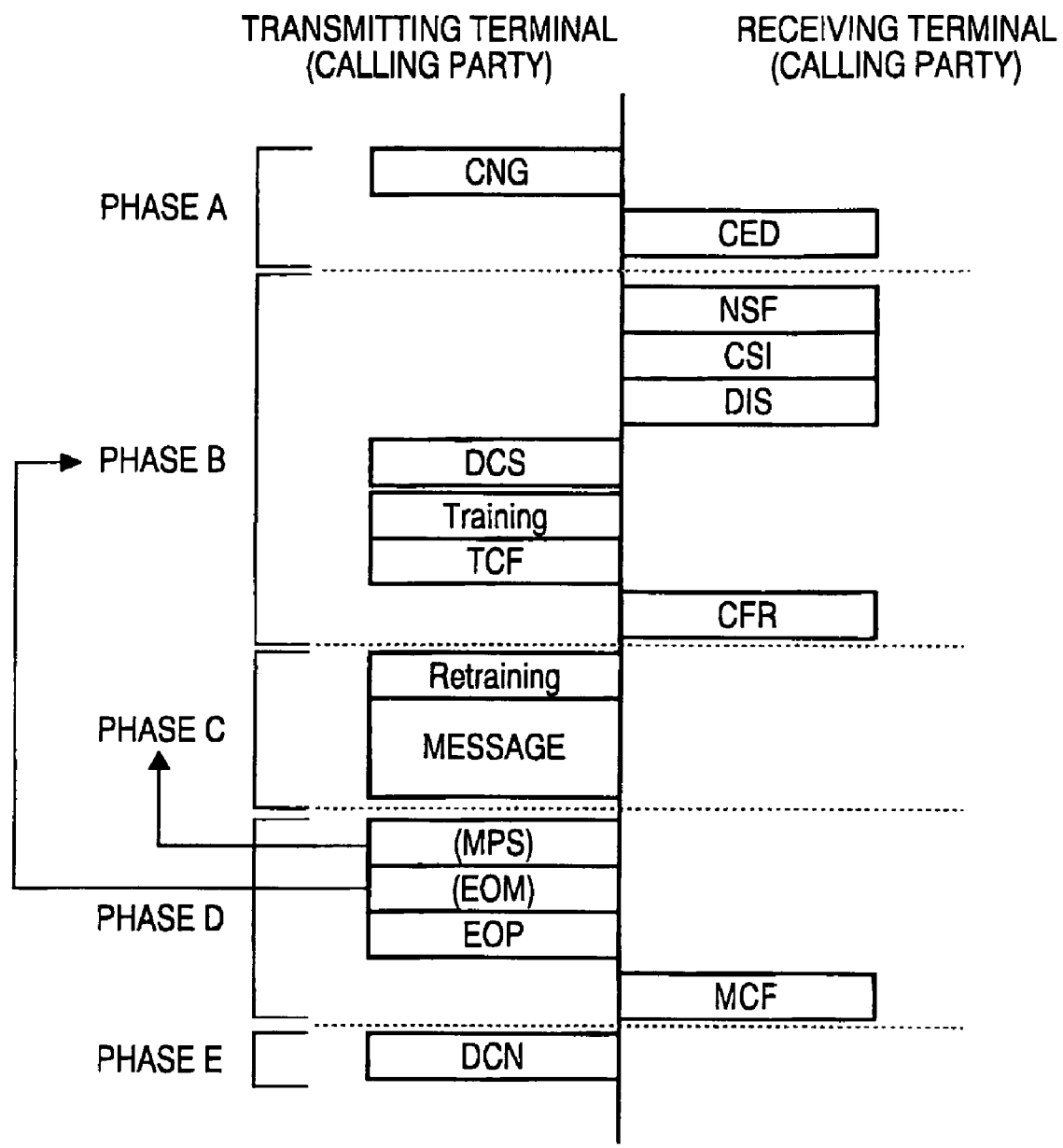
FIG. 16 is a schematic diagram for explaining the facsimile transmission protocol in conformity with the ITU-T recommendations.

When the leading edge of the document sheet G1 in the feeding direction (after being detected by the lead sensor 54) reaches the scanning position, the control unit 100 makes the image scanner 22 scan the second side of the document sheet G1 as shown in FIG. 15 (T9 in FIG. 8). Subsequently, the control unit 100 executes an inversion process for adjusting the direction of the scanned image data of the second side to that of the scanned image data of the first side, and transmits the inverted image data of the second side to the destination terminal (T10 in FIG. 8).

As explained above, the MFD 1 of this embodiment reverses document sheet G1 after the scanning of the first side. Therefore, a certain "preparation time t2" (see FIG. 8) is necessary before the transmission process for the second side (transmission of the second side image). Specifically, the sum of a time necessary for the bidirectional feeding of the document sheet G1, a time necessary for the re-feeding of the document sheet G1 to the scanning position after the bidirectional feeding, a time necessary for the scanning of the second side of the document sheet G1 and a time necessary for the inversion process for the second side image is necessary as the preparation time t2.

The maximum document size allowing for the double-side scanning (i.e. allowing the ADF 4 to feed the document to achieve the double-side scanning) is the A4 size in the MFD 1 of this embodiment as mentioned before. In the ADF 4 of this embodiment supporting the double-side scanning up to the A4 size, it takes approximately 2.5 seconds for the bidirectional feeding of the document sheet G1, approximately 0.5 seconds for the re-feeding of the document sheet G1 to the scanning position after the bidirectional feeding, and approximately 1 second for the scanning of the second side image (for a prescribed number of lines) and the inversion process, and thus the preparation time t2 is approximately 4 seconds (actual measurement).

Incidentally, the above preparation time t2 substantially equals a time t4 (see FIG. 8) which is necessary for the preparation for the transmission of the second side image to the destination terminal after the (tentative) reception of the MCF "sig11" (immediately returned from the destination terminal in response to the MPS "sig1" transmitted by the MFD 1), and the MFD 1 and the destination terminal will stay in a "no-communication state" until the time t4 passes since the reception of the MCF "sig11" by the MFD 1. In cases where the facsimile communication is executed according to the ITU-T recommendations, if the no-communication state between the MFD 1 and the destination terminal continues for more than three seconds, a timeout occurs and a process for unilaterally disconnecting the line (call) is executed. However, in this embodiment, the MCF "sig11" transmitted from the destination terminal is ignored as mentioned above.

Therefore, the MFD 1 in this embodiment transmits an MPS "sig2" to the destination terminal (T7 in FIG. 8) a time period t1 (=3 seconds) after the transmission of the MPS "sig1", by which the no-communication state exceeding three seconds is avoided and the unilateral disconnection by the destination terminal is eliminated. Incidentally, an MCF "sig12" (T8 in FIG. 8) which is immediately returned from the destination terminal in response to the MPS "sig2" is received (detected) by the NCU 118, that is, received by the relaying unit 108 and transferred to the NCU 118 without being ignored.

When the trailing edge of the document sheet G1 in the feeding direction (after being detected by the lead sensor 54) reaches the scanning position, the control unit 100 makes the image scanner 22 end the image scanning of the second side of the document sheet G1 (T11 in FIG. 8). The document sheet G1 after the scanning of the second side is guided by the guide flaps 50 to enter the bidirectional path 39 from the connecting position 38 of the document feeding path 32, by which the reversible feeding of the document sheet G1 is started again (T11 in FIG. 8).

When the image scanning of the second side of the document sheet G1 and the transmission of the second side image is completed (T12 in FIG. 8), an MPS "sig3" (see "80e" in FIG. 8) is transmitted by the NCU 118 to the destination terminal, by which the destination terminal is informed that there exists image data to be further transmitted from the MFD 1 (i.e. scanned image data of the next page). As will be explained later, in this embodiment, an MCF "sig13" (T13 in FIG. 8) immediately returned from the destination terminal in response to the MPS "sig3" is ignored, an MCF "sig14" (T16 in FIG. 8) immediately returned from the destination terminal in response to an MPS "sig4" (T15 in FIG. 8, transmitted by the NCU 118 the time period t1 after the transmission of the MPS "sig3") is also ignored, and thereafter an MCF "sig15" (T20 in FIG. 8) immediately returned from the destination terminal in response to an MPS "sig5" (T19 in FIG. 8, transmitted by the NCU 118 as the third MPS from the MPS "sig3") is received (detected) by the NCU 118.

When the leading edge of the document sheet G1 entering the bidirectional path 39 reaches the intersecting position 40, the document sheet G1 presses the guide flaps 46 upward and thereby advances to the upper end 41 side part (upper part) of the bidirectional path 39 similarly to FIG. 13. After the trailing edge of the document sheet G1 in the feeding direction has perfectly entered the upper end 41 side part (upper part) of the bidirectional path 39 across the intersecting position 40, the control unit 100 reverses the rotation of the motor so as to rotate the reversible roller 43 in the reverse direction and return the document sheet G1 to the intersecting position 40, similarly to FIG. 14. The document sheet G1 returned from the upper end 41 of the bidirectional path 39 is guided by the guide flaps 46 and 47 to the scanning position side part (left-hand side part) of the document feeding path 32. By the second bidirectional operation, the document sheet G1 is fed again through the document feeding path 32 with its front and trailing edges reversed from each other (i.e. in the same state as the first feeding in the document feeding path 32) (T14 in FIG. 8). After the second bidirectional operation, the document sheet G1 is fed through the document feeding path 32 so as to let the first side face the image scanner 22 at the scanning position.

Thereafter, the document sheet G1 passing across the scanning position (with no image scanning operation by the image scanner 22) and reaching the connecting position 38 is guided by the guide flaps 50 toward the output tray 31 and ejected by the ejection roller 36 to the output tray 31 with the first side facing downward (T17 in FIG. 8). After the ejection of the document sheet G1, the control unit 100 which has detected that the next document sheet G2 is on the input tray 30 (i.e. that the first sensor 52 is ON) rotates the pick-up roller 33 and the separation roller 34 in the feeding direction, by which the document sheet G2 on the input tray 30 is supplied to the document feeding path 32 (T18 in FIG. 8). Thereafter, the duplex scanning of the document sheet G2 is executed similarly to the above process. When there exists no document on the input tray 30, the control unit 100 ends the duplex scanning process.

As explained above, after the scanning of the second side of the document sheet G1, the MFD 1 further reverses the document sheet G1 and ejects the document sheet G1 to the output tray 31. Thereafter, the MFD 1 successively executes the feeding of the next document sheet G2 (T18 in FIG. 8), the scanning of the first side image of the document sheet G2 (T21 in FIG. 8) and the transmission of the first side image of the document sheet G2 (T22 in FIG. 8). Therefore, a preparation time t3 longer than the aforementioned preparation time t2 is necessary between the completion of the transmission of the second side image of the document sheet G1 (T12 in FIG. 8) and the start of the transmission of the first side image of the document sheet G2 (T22 in FIG. 8). In order to avoid the disconnection due to the timeout, the MFD 1 of this embodiment prevents the excessively long no-communication state by successively transmitting the MPS "sig4" and the MPS "sig5" by ignoring or discarding the MCF "sig13" (T13 in FIG. 8) and the MCF "sig14" (T16 in FIG. 8) in succession, as mentioned above.

Incidentally, while the above double-side scanning operation by the image scanner 22 and the ADF 4 has been explained assuming that the document sheets Gn are finally ejected to the output tray 31 preserving the original order of pages of the document sheets Gn stacked up on the input tray 30, each document sheet Gn after the scanning of the second side (i.e. after the feeding of the document sheet Gn through the scanning position with the second side facing the image scanner 22) may also be directly ejected to the output tray 31 via the connecting position 38 without guiding the document sheet Gn again to the bidirectional path 39 in cases where the preservation of the order of pages is unnecessary. Although the order of pages is not preserved in this case, the final bidirectional feeding can be left out and the time necessary for the double-side scanning of each document sheet Gn can be reduced. Since the preparation time t3 can be reduced in this case, the MCF "sig14" (T16 in FIG. 8) may be received (detected) by the NCU 118 without ignoring it.

Figure 6:
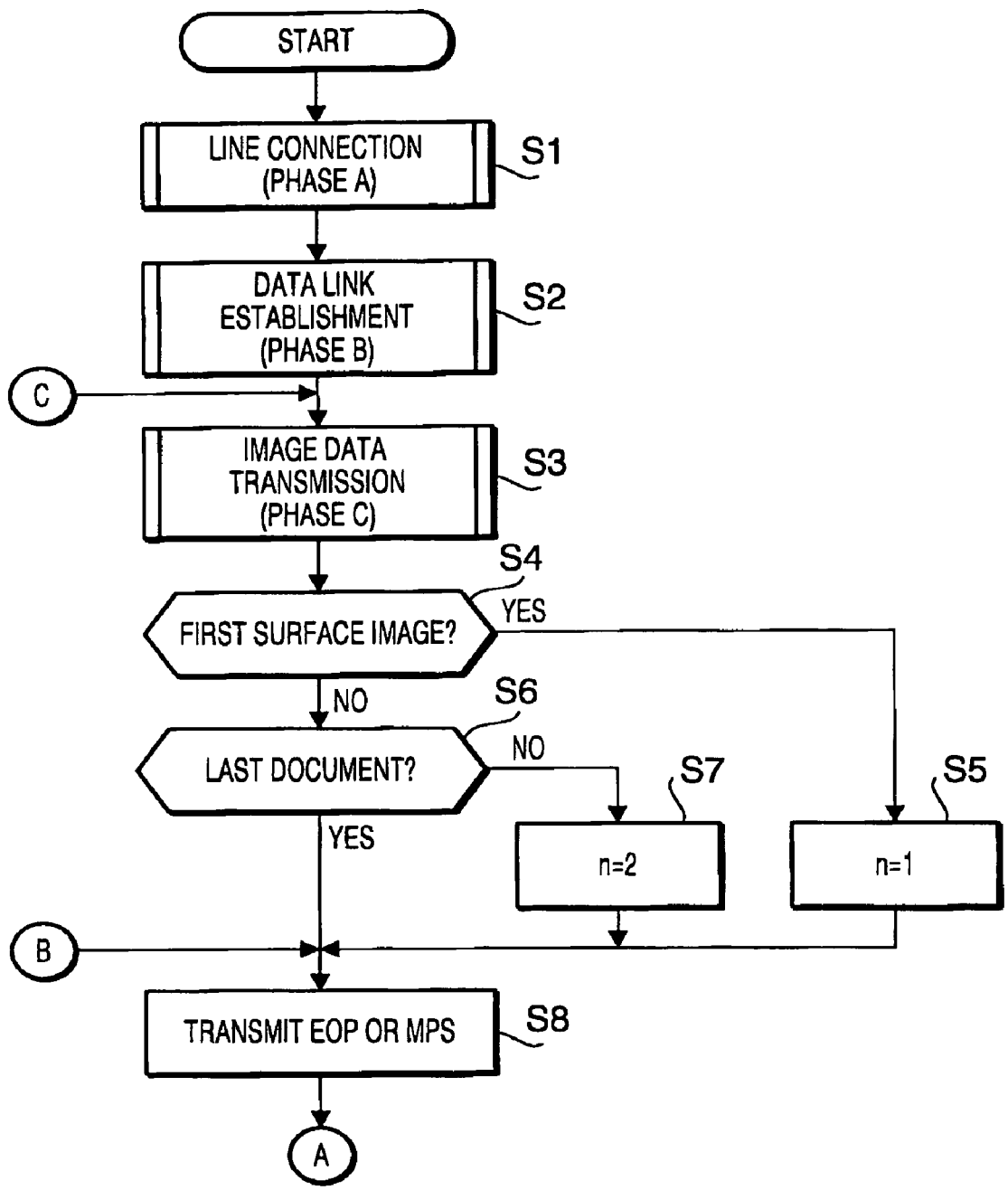
FIGS. 6 and 7 are flowcharts showing an example of a facsimile communication process executed by a CPU of the MFD in a facsimile mode.
Figure 7:
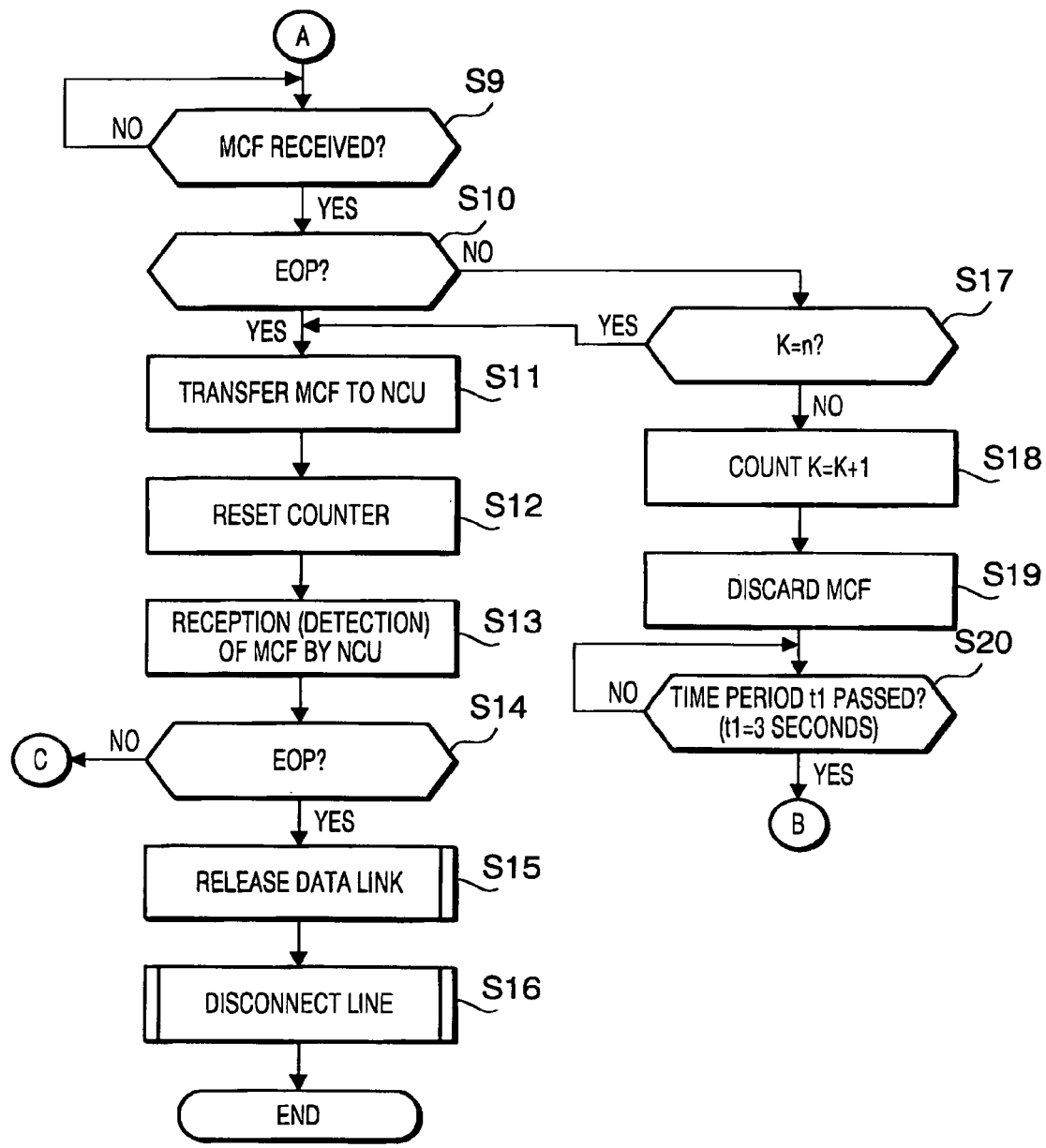

In the following, an example of a facsimile communication process executed by the CPU 101 in the facsimile mode will be described referring to flow charts of FIGS. 6 and 7. The facsimile communication process of FIGS. 6 and 7 is executed when the MFD 1 has been set to the facsimile mode and the double-side scanning mode and at least one document sheet Gn has been set on the input tray 30. Needless to say, the facsimile communication process is executed according to the data transmission protocol in conformity with the ITU-T recommendations. Since the data transmission protocol is widely known, detailed explanation of processes executed in the phases A-E included in the data transmission protocol will be omitted for brevity.

In the MFD 1 of this embodiment, the facsimile transmission of images on both sides of each document sheet Gn becomes possible when the facsimile mode key on the operation panel 5 is pressed, a FAX number specifying the destination terminal is inputted and the double-side scanning function (displayed on the LCD 11) is selected by the user. In this state, when the scanning start instruction is inputted by the user through the operation panel 5, a line connection process specified by the phase A is executed (S1) and thereafter a data link establishment process specified by the phase B is executed (S2), by which the communication of image data between the MFD 1 and the destination terminal becomes possible.

As the scanning of the first side image is executed as explained above, the scanned first side image (image data) is transmitted to the destination terminal according to a protocol (procedure) specified by the phase C (S3). After the transmission of the first side image, whether the image transmitted in the step S3 is a first side image or not is judged (S4). The judgment can easily be made by, for example, counting the number of times of document scanning since the input of the scanning start instruction or by monitoring the feeding state of each document. When the image transmitted in S3 is judged to be a first side image (S4: YES), the process advances to step S5 and a judgment value n (to be used in step S17 explained later) is set to "1". Subsequently, the process advances to step S8 and the MPS (after the transmission of the first side image) is transmitted to the destination terminal. Incidentally, the judgment value n represents the number of times of the ignorance of the MPS that should be carried out after the transmission of an image (image data). The step S5 and step S7 (explained later) are steps for setting the number of times. The number of times is stored in the RAM 103 or a register of the CPU 101, for example.

On the other hand, when the image transmitted in S3 is judged not to be a first side image, that is, judged to be a second side image (S4: NO), whether the document sheet Gn currently scanned is the last document or not is judged (S6). The judgment is made based on the ON/OFF state of the first sensor 52. When the document sheet Gn is judged not to be the last document (S6: NO), the judgment value n (to be used in the step S17 explained later) is set to "2" (S7). Subsequently, the process advances to the step S8 and the MPS (after the transmission of the second side image) is transmitted to the destination terminal. Incidentally, the judgment value n is set to "2" in the step S7 since the preparation for the transmission of the first side image of the next document takes a long time in this case where the transmitted image is a second side image (S4: NO) and the document sheet Gn is not the last document (S6: NO).

When the document sheet Gn is judged to be the last document in the step S6 (S6: YES), an EOP (End Of Procedure) signal is transmitted to the destination terminal in the step S8 since there exists no image to be transmitted next. After the MPS or the EOP signal is transmitted in the step S8, the process advances to step S9 shown in FIG. 7.

In the step S9, whether an MCF sent back from the destination terminal has been received by the relaying unit 108 (see FIG. 5) or not is judged. Specifically, whether or not the MCF, returned from the destination terminal in response to the MPS or the EOP signal transmitted by the NCU 118 (see FIG. 5), has been received by the relaying unit 108 or not is judged. The judgment is made based on the aforementioned result of comparison outputted by the relaying unit 108 to the CPU 101. When the MCF is judged to have been received (S9: YES), whether the MCF is a response to an EOP signal or not is judged (S10). When the MCF is a response to an EOP signal (S10: YES), the MCF is transferred from the relaying unit 108 to the NCU 118 by the CPU 101 (S11), the count K counted and held by the counter 109 (see FIG. 5) is reset (S12), and the MCF is received (detected) by the NCU 118 (S13).

In the case where the MCF is a response to an EOP signal (S10: YES, S14: YES), a process for releasing the data link is executed according to a protocol (procedure) specified by the phase D (S15) and thereafter a process for disconnecting the line (call) by transmitting a DCN is executed (S16). When the received MCF is a response to an MPS in the step S14 (S14: NO), the process returns to the step S3 in FIG. 6, by which a process for transmitting the next image data to the destination terminal (S3) and the steps following the step S3 is executed.

In the step S10, when the received MCF is not a response to an EOP signal but a response to an MPS in the step S10 (S10: NO), the process advances to step S17 and whether or not the count K counted by the counter 109 is equal to the set value (judgment value) n which has been set in the step S5 or S7 (i.e. whether the count K has reached the set value n or not) is judged by the CPU 101.

For example, when the process advances to the step S17 after the transmission of the first side image of the first document sheet G1 (S4: YES), the judgment of the step S17 results in "NO" since the set value n has been set to "1" and the count K is the initial value "0". In this case, the count K held by the counter 109 is incremented by 1 according to a signal from the CPU 101 (S18) and thereafter the MCF received by the relaying unit 108 is ignored without being transferred to the NCU 118 (S19). Since the MCF is not received (detected) by the NCU 118 in this case, the MPS is transmitted again to the destination terminal in the step S8 on condition that the time period t1 (=3 seconds, see FIG. 8) has passed since the transmission of the previous MPS (S20: YES). Thereafter, when the process advances to the step S17 again via the steps S9 and S10, the count K and the set value n are equal (=1), and thus the MCF received by the relaying unit 108 is transferred to the NCU 118 without being ignored (S11). Thereafter, the count K held by the counter 109 is reset in S12 as mentioned above. As above, after the transmission of the first side image of the first document sheet G1, the transfer of the MCF to the NCU 118 is interrupted only once (i.e. the detection of the MCF by the NCU 118 is prevented by the CPU 101 only once) by ignoring the MCF only once.

Meanwhile, when the process advances to the step S17 after the transmission of the second side image of the first document sheet G1 (S4: NO) and the judgment that the document sheet G1 is not the last document (S6: NO), the judgment of the step S17 results in "NO" since the set value n has been set to "2" and the count K has been reset to the initial value "0". Also in this case, the count K held by the counter 109 is incremented by 1 (S18), the MCF is ignored by the CPU 101 (S19), and the MPS is transmitted again in the step S8 on the condition that the time period t1 (=3 seconds) has passed since the transmission of the previous MPS (S20: YES). The loop process is continued until the count K counted by the counter 109 equals the set value n (=2) in the step S17. As above, in the case where the process advances to the step S17 after the transmission of the second side image of the first document sheet G1 (S4: NO) and the judgment that the document sheet G1 is not the last document (S6: NO), the transfer of the MCF to the NCU 118 is interrupted twice, that is, the detection of the MCF by the NCU 118 is prevented twice by the CPU 101. Since the line (call) is disconnected upon the third ignorance of the MCF according to the ITU-T recommendations, the number of times of the ignorance of the MCF can be set up to 2. In cases where the facsimile transmission protocol is not restricted by the ITU-T recommendations, the set value n can of course be set at an arbitrary value according to the preparation time t2 or t3 of the MFD 1.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims. For example, while the transfer of the MCF to the NCU 118 is interrupted by the relaying unit 108 implemented by a hardware logic circuit (e.g. integrated circuit) in the above embodiment, it is also possible to forcibly interrupt the transfer of the MCF to the NCU 118 by software, by letting the CPU 101 execute a program implementing the function of the relaying unit 108.

What is claimed is:

1. A communication apparatus which transmits a first side image and a second side image of each document scanned by a scanner at a scanning position in a feeding process to a receiver according to a facsimile transmission protocol, comprising:
   a facsimile controller which transmits an MPS to the receiver on each completion of the transmission of the image of each side of the document while retransmitting the MPS to the receiver when an MCF returned from the receiver in response to the MPS is not detected within a certain period of time after the transmission of the MPS; and
   an MCF detection unit which allows the facsimile controller to detect the MCF based on a fact that the number of times of reception of the MCF from the receiver has reached a preset number of times.

2. The communication apparatus according to claim 1, wherein the preset number of times employed by the MCF detection unit is preset at numbers of less than three.

3. The communication apparatus according to claim 1, wherein the MCF detection unit ignores each MCF based on a fact that the number of times of reception of the MCF is less than the preset number of times.

4. The communication apparatus according to claim 1, wherein the MCF detection unit interrupts transfer of each MCF to the facsimile controller based on a fact that the number of times of reception of the MCF is less than the preset number of times.

5. The communication apparatus according to claim 1, wherein the preset number of times employed by the MCF detection unit after the transmission of the second side image to the receiver is preset to be larger than the preset number of times employed by the MCF detection unit after the transmission of the first side image to the receiver when the document feeding process is executed for feeding each document to the scanning position with the first side facing the scanner, inverting the document which passed the scanning position, feeding the document again to the scanning position with the second side facing the scanner, further inverting the document which passed the scanning position, and feeding the document again to the scanning position with the first side facing the scanner.

6. The communication apparatus according to claim 1, wherein the communication apparatus is configured to successively transmit partial images of a prescribed width as each partial image is obtained by the document scanning by the scanner.

7. A facsimile communication method for a communication apparatus which transmits a first side image and a second side image of each document scanned by a scanner at a scanning position in a feeding process to a receiver according to a facsimile transmission protocol and which comprises a facsimile controller transmitting an MPS to the receiver on each completion of the transmission of the image of each side while retransmitting the MPS to the receiver when an MCF returned from the receiver in response to the MPS is not detected within a certain period of time after the transmission of the MPS, comprising:
    an MCF detection step of preventing the facsimile control unit from detecting the MCF based on a fact that the number of times of reception of the MCF is less than a preset number of times.

8. The facsimile communication method according to claim 7, wherein the preset number of times employed by the MCF detection step is preset at numbers of less than three.

9. The facsimile communication method according to claim 7, wherein the MCF detection step ignores each MCF based on a fact that the number of times of reception of the MCF is less than the preset number of times.

10. The facsimile communication method according to claim 7, wherein the MCF detection step interrupts transfer of each MCF to the facsimile control unit based on a fact that the number of times of reception of the MCF is less than the preset number of times.

11. The facsimile communication method according to claim 7, wherein the preset number of times employed by the MCF detection step after the transmission of the second side image to the receiver is preset to be larger than the preset number of times employed by the MCF detection step after the transmission of the first side image to the receiver when the feeding process is executed for feeding each document to the scanning position with the first side facing the scanner, inverting the document which passed the scanning position, feeding the document again to the scanning position with the second side facing the scanner, further inverting the document which passed the scanning position, and feeding the document again to the scanning position with the first side facing the scanner.

12. A facsimile communication method for a communication apparatus which transmits a first side image and a second side image of each document scanned by a scanner at a scanning position in a feeding process to a receiver according to a facsimile transmission protocol, comprising:
    an MPS transmitting step of transmitting an MPS to the receiver on each completion of the transmission of the image of each side;
    an MCF detecting step of detecting an MCF returned from the receiver in response to the MPS;
    an MPS retransmitting step of retransmitting the MPS to the receiver when the MCF returned from the receiver in response to the MPS transmitted in the MPS transmitting step or the MPS retransmitting step is not detected by the MCF detecting step within a certain period of time; and
    an MCF detection step of preventing the MCF detecting step from detecting the MCF based on a fact that the number of times of reception of the MCF from the receiver is less than a preset number of times.

13. A non-transitory-computer readable medium having computer readable instructions stored thereon, which, when executed by a computer functioning as a communication apparatus transmitting a first side image and a second side image of each document scanned by a scanner at a scanning position in a feeding process to a receiver according to a facsimile transmission protocol, are configured to:
    transmit an MPS to the receiver on each completion of the transmission of the image of each side;
    detect an MCF returned from the receiver in response to the MPS;
    retransmit the MPS to the receiver when the MCF returned from the receiver in response to the MPS transmitted is not detected within a certain period of time; and
    prevent the MCF from being detected based on a fact that the number of times of reception of the MCF from the receiver is less than a preset number of times.

\* \* \* \* \*